United States Patent
Jung et al.

(10) Patent No.: US 11,503,229 B2
(45) Date of Patent: Nov. 15, 2022

(54) IMAGE SENSOR AND IMAGING DEVICE INCLUDING THE SAME

(71) Applicant: SAMSUNG ELECTRONICS CO., LTD., Suwon-si (KR)

(72) Inventors: Yunhwan Jung, Suwon-si (KR); Kyoungmin Koh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 17/038,347

(22) Filed: Sep. 30, 2020

(65) Prior Publication Data

US 2021/0266477 A1    Aug. 26, 2021

(30) Foreign Application Priority Data

Feb. 24, 2020    (KR) ......................... 10-2020-0022363

(51) Int. Cl.
*H04N 5/355* (2011.01)
*H04N 5/3745* (2011.01)
*H04N 5/378* (2011.01)

(52) U.S. Cl.
CPC ......... *H04N 5/355* (2013.01); *H04N 5/37455* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 8,957,994 B2* | 2/2015 | Jakobson | H04N 5/378 348/241 |
| 9,774,811 B1 | 9/2017 | Ebihara et al. | |
| 9,843,738 B2 | 12/2017 | Cremers et al. | |
| 10,070,084 B2 | 9/2018 | Guidash et al. | |
| 2014/0291482 A1* | 10/2014 | Tanaka | H03K 5/2481 327/108 |
| 2015/0189209 A1 | 7/2015 | Yang et al. | |
| 2017/0195593 A1* | 7/2017 | Yeh | H04N 5/3745 |
| 2018/0288349 A1* | 10/2018 | Yoshida | H04N 5/35527 |
| 2019/0149754 A1 | 5/2019 | Otaka | |
| 2019/0246057 A1 | 8/2019 | Ebihara et al. | |
| 2021/0235034 A1* | 7/2021 | Asakura | H03M 1/1295 |

* cited by examiner

*Primary Examiner* — James M Hannett
(74) *Attorney, Agent, or Firm* — F. Chau & Associates, LLC

(57) ABSTRACT

An imaging device includes a pixel array with a plurality of pixels each configured to generate a reset signal and an image signal, a sampling circuit including a plurality of samplers connected to column lines, where each sampler generates a first comparison signal by comparing the reset signal with a ramp signal and generates a second comparison signal by comparing the image signal with the ramp signal. An ADC converts each of the first and second comparison signals into a digital signal. Each sampler performs an auto-zero operation for initializing itself before performing the comparing with respect to the reset signal in a first mode, and performs a respective auto-zero operation before performing the comparing for each of the reset signal and the image signal in a second mode.

20 Claims, 16 Drawing Sheets

IMAGE SENSOR AND IMAGING DEVICE INCLUDING THE SAME

CROSS-REFERENCE TO RELATED APPLICATION(S)

This application claims benefit of priority to Korean Patent Application No. 10-2020-0022363 filed on Feb. 24, 2020 in the Korean Intellectual Property Office, the disclosure of which is incorporated herein by reference in its entirety.

Technical Field

Example embodiments of the present disclosure relate generally to an image sensor and an imaging device including the same, and more particularly to a high dynamic range image sensor.

Discussion of the Related Art

An image sensor is a semiconductor-based sensor that generates electrical signals in response to light. The image sensor may include a pixel array having a plurality of pixels, and logic circuitry configured to drive the pixel array and generate an image. Each pixel may include a photodiode configured to generate electric charge in response to light, and a pixel circuit configured to convert electric charge generated by the photodiode into an electrical signal. The image sensor may be widely applied to cameras for obtaining a still image or video, where the camera may be a stand-alone camera or part of a smartphone, a tablet PC, a laptop computer, a television, a vehicle, and the like.

In a high dynamic range (HDR) image sensor, an illuminance sensed by each pixel may be determined as being within a low illuminance range or a high illuminance range. With this approach, an analog to digital converter (ADC) used to digitize the illuminance value with a fixed number of bits, may distinguish the illuminance values with a higher overall dynamic range. Thus, variations within regions of an image frame that would otherwise be indistinguishable because the regions are too bright or too dark, may be more accurately captured with representative gray scale values.

SUMMARY

An example embodiment of the present disclosure provides an imaging device and an image sensor including a sampler which may perform an auto-zero operation differently in a high gain sampling operation than in a low gain sampling operation, such that reset noise may be removed and power consumption may be significantly reduced.

According to an example embodiment of the present disclosure, an imaging device includes a pixel array including a plurality of pixels connected to a plurality of row lines and a plurality of column lines, where each of the plurality of pixels is configured to generate a reset signal and an image signal. A sampling circuit may include a plurality of sampling circuits connected to the plurality of column lines. Each of the sampling circuits is configured to generate a first comparison signal by comparing the reset signal with a ramp signal and to generate a second comparison signal by comparing the image signal with the ramp signal. An analog-digital converter is configured to convert each of the first and second comparison signals into a respective digital signal. A column driver is configured to generate image data, based on the first comparison signal and the second comparison signal converted into digital signals. Each of the sampling circuits performs an auto-zero operation for initializing itself before performing the comparing with respect to the reset signal in a first mode, and performs a respective auto-zero operation before performing the comparing with respect to each of the reset signal and the image signal in a second mode.

According to an example embodiment of the present disclosure, an image sensor includes a pixel array including a plurality of pixels connected to a plurality of row lines and a plurality of column lines, where each of the plurality of pixels is configured to generate a pixel signal, a plurality of samplers connected to the plurality of column lines, and configured to output a comparison signal by comparing the pixel signal with a ramp signal, and an analog-digital converter configured to generate image data by converting the comparison signal into a digital signal, wherein each of the plurality of samplers includes a comparator, a first auto-zero switch configured to be connected between a first input node and a first output node of the comparator, a second auto-zero switch configured to be connected between a second input node and a second output node of the comparator, a first capacitor connected between the first input node and a first node, a second capacitor connected between the second input node and a second node, a first switch connected between the first node and an input terminal of the ramp signal, a second switch connected between the first node and an input terminal of the pixel signal, and third and fourth switches connected in parallel between the second node and the input terminal of the pixel signal.

According to an example embodiment of the present inventive concept, an image sensor includes a plurality of pixels connected to a plurality of row lines and a plurality of column lines and configured to generate a reset signal, a first image signal, and a second image signal, a plurality of sampling circuits connected to the plurality of column lines and configured to generate a comparison signal by sequentially comparing each of the reset signal, the first image signal, and the second image signal with an up-ramp signal or a down-ramp signal, and an analog-digital converter configured to generate image data by converting the comparison signal into a digital signal. Each sampling circuit operates at a first amplification gain and generates the comparison signal using the down-ramp signal in the first mode, and operates at a second amplification gain smaller than the first amplification gain and generates the comparison signal using the up-ramp signal in the second mode.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, embodiments of the present inventive concept will be described with reference to the accompanying drawings.

Figure 1:
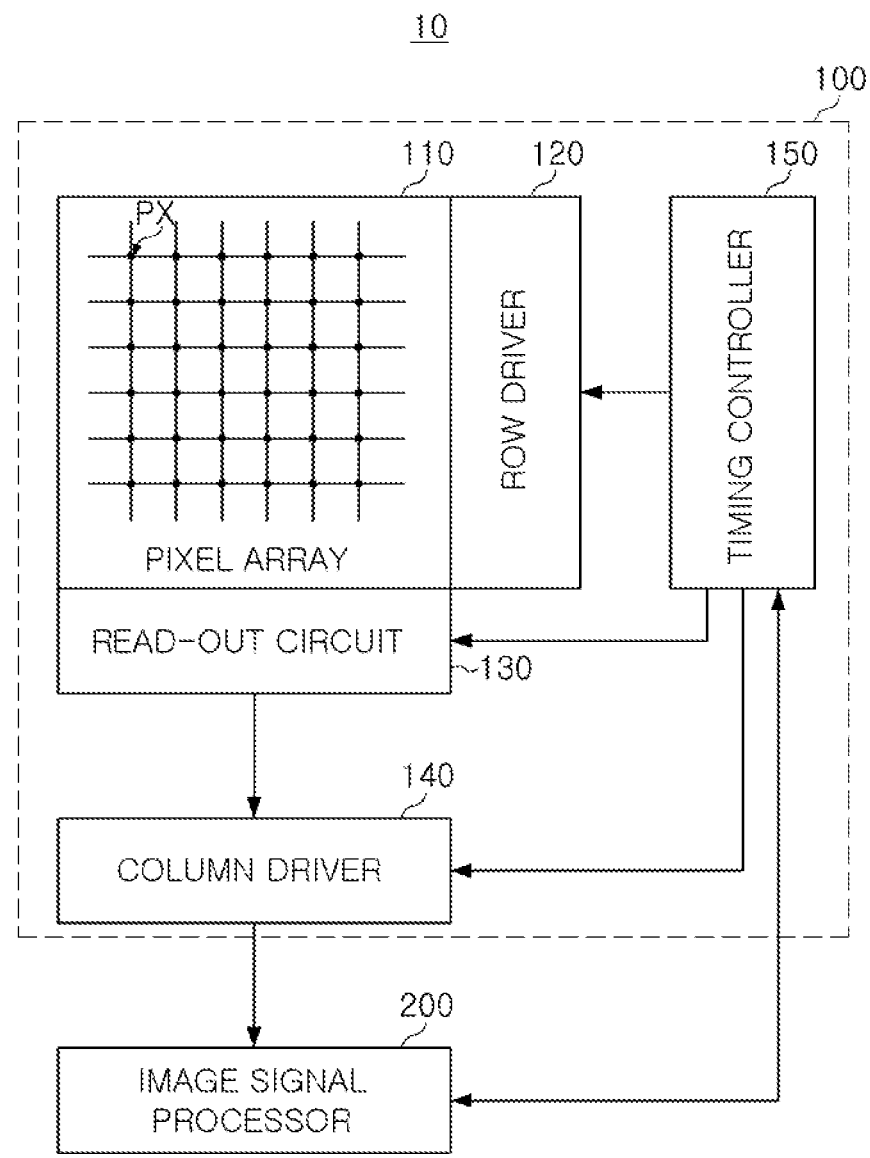
FIG. 1 is a diagram illustrating an imaging device according to an example embodiment of the present disclosure.

FIG. 1 is a diagram illustrating an imaging device, 10, according to an example embodiment. The imaging device 10 may include an image sensor 100 and an image signal processor (ISP) 200. The image sensor 100 may sense light from a scene, such as light reflected from an object, to represent an image of the scene. The image sensor 100 may include a pixel array 110, a row driver 120, a read-out circuit 130, a column driver 140, and a timing controller 150.

The pixel array 110 may include a plurality of pixels PX arranged in an array along a plurality of row lines and a plurality of column lines. (The following discussion with respect to a pixel PX is applicable to any of the plurality of pixels PX.) A pixel PX may include a photoelectric conversion element configured to generate electric charge in response to incident light, such as a photodiode, a phototransistor, a pinned photodiode, or the like. A pixel PX may include at least two photoelectric conversion elements. A pixel PX may include two or more photoelectric conversion elements to generate pixel signals corresponding to various colors of light or to provide an autofocusing function.

A pixel PX may sense light within a certain spectrum range using the photoelectric conversion element. For example, the plurality of pixels PX may include a red pixel for sensing light in a red spectrum range, a green pixel for sensing light in a green spectrum range, and a blue pixel for sensing light in a blue spectrum range. In other embodiments, additional or alternative color pixels such as white are included. A color filter for transmitting light in a certain spectrum range may be disposed on any pixel PX. The illuminance measurement methods and circuitry of the present disclosure may be applied individually to the different color pixels.

A pixel PX may be in a high illuminance state corresponding to a sensed illuminance within a high range of illuminance, e.g., above a threshold, or a low illuminance state corresponding to a sensed illuminance within a low range of illuminance, e.g., below the threshold, depending on the intensity of light incident upon the photoelectric conversion element. Embodiments herein may make illuminance measurements for each pixel PX under the assumption that the pixel PX may be in either state at any given time. Hereafter, the term "high illuminance pixel" may be used to refer to the pixel PX being considered or determined to be in the high illuminance state and "low illuminance pixel" may be used to refer to the pixel PX being considered or determined to be in the low illuminance state. In an embodiment, current measurements for both states are made for each pixel PX in every frame, and each pixel PX is determined to be in the low illuminance or high illuminance state based on the results of the current measurement. Overall A/D conversion with respect to all the pixels PX may then be more accurately performed using analog values associated with one range or the other. With this capability, the image sensor 100 may be understood as a high dynamic range (HDR) image sensor.

In another embodiment, a high illuminance pixel and a low illuminance pixel may be distinguished from each other based on a pixel value of a previous frame. For example, among the plurality of pixels PX, a pixel of which a pixel value in a previous frame is equal to or higher than a certain threshold value may be defined as a high illuminance pixel, and a pixel of which a pixel value in a previous frame is lower than a certain threshold value may be defined as a low illuminance pixel. The information related to an illuminance value, classification of pixels, and the like, may be stored in an internal memory or an external memory of the image sensor 100 and may be used to perform a sampling operation, and the like.

A pixel PX may include a pixel circuit for generating a pixel signal. The pixel circuit may include a transfer transistor, a drive (source-follower) transistor, a select transistor, and a reset transistor. The pixel signal may be an analog signal, and may include a reset signal and an image signal. The reset signal may be a voltage signal corresponding to a certain power voltage, and the image signal may be a voltage signal corresponding to electric charge generated by the photoelectric conversion element.

The row driver 120 may drive the pixel array 110 by a row line unit. For example, the pixel array 110 may generate a transfer control signal for controlling the transfer transistor of the pixel signal, a reset control signal for controlling the reset transistor, or a select control signal for controlling the select transistor. In an example embodiment, the row driver 120 may drive a plurality of row lines of the pixel array 110 in sequence. The pixel array 110 may generate a pixel signal in response to the control signal generated by the row driver 120.

The read-out circuit 130 may convert a pixel signal generated by the pixel array 110 into a digital signal and may output the digital signal. The read-out circuit 130 may include a sampling circuit and an analog-to-digital converter (ADC).

The sampling circuit may include a plurality of sampler circuits (hereafter, "samplers"). In an example embodiment, the samplers may be correlated double samplers (CDSs). The samplers may be selectively connected to the pixels PX included in a row selected by the row driver 120 through the column lines and may detect a reset signal and an image signal from the pixels PX of the selected row. The samplers may compare each of the reset signal and the image signal with a certain ramp signal and may output a comparison signal as a result of the comparison. Image data of an entire image frame may be sampled by performing this process row by row for the remaining rows of the pixel array.

The samplers may be initialized by performing an auto-zero operation before performing a comparison operation. In an example embodiment, the plurality of samplers may perform the auto-zero operation for a high illuminance pixel and a low illuminance pixel in different manners. For example, the samplers may perform the auto-zero operation for a low illuminance pixel before performing a first comparison operation. Also, samplers may perform the auto-zero operation for a high illuminance pixel before performing each comparison operation.

As for the low illuminance pixel, since an amplification gain (interchangeably, just "gain") may be relatively high in the comparison operation of the sampler, it may be beneficial to significantly reduce reset noise (or kT/C noise) generated in the initializing process. Thus, the samplers may perform a single auto-zero operation for all the comparison operations with respect to for the low illuminance pixel. As for the high illuminance pixel, since gain may be relatively low in the comparison operation of the sampler, an effect of reset noise generated in the initialization process of the sampler, affecting the comparison operation, may be relatively low, but it may be desirable to reduce a headroom voltage corresponding to a driving current of the sampler in terms of driving with low power. Thus, the samplers may perform another auto-zero operation (a multi-auto-zero operation) for each comparison operation with respect to a high illuminance pixel.

An analog-to-digital converter (ADC) may be configured as a single-slope analog-to-digital converter. The ADC may include a plurality of counters. In an example embodiment, the plurality of counters may be up/down counters or bit-wise inversion counters. The plurality of counters may be connected to the plurality of samplers, respectively, may count comparison signals output from the samplers, and may output digital signals. For example, the plurality of counters may convert a reset signal into a digital signal by counting a time period corresponding to a result of comparison between a reset signal and a ramp signal in a comparison signal, and may output the digital signal. Also, the plurality of counters may convert an image signal into a digital signal by counting a period corresponding to a result of comparison between an image signal and a ramp signal in a comparison signal, and may output the digital signal.

The column driver 140 may include a latch or a buffer which may temporarily store a digital signal. The column driver 140 may process the digital signal received from the read-out circuit 130 and may output image data. For example, the column driver 140 may generate image data based on a difference between a counter value generated from a reset signal and a counter value generated from an image signal and may output the generated image data to the image signal processor 200.

The timing controller 150 may control operations or timings of the row driver 120, the read-out circuit 130, and the column driver 140.

The image signal processor 200 may generate an image by processing image data output from the column driver 140. For example, the image signal processor 200 may generate image by performing a signal processing operation such as color interpolation, color correction, gamma correction, color space conversion, edge correction, and the like.

As the imaging device 10 in the example embodiment includes the image sensor 100 having a sampler configured to perform a single auto-zero operation for a low illuminance pixel and to perform a multi-auto-zero operation for a high illuminance pixel, quality of an image may improve and power consumption may be reduced.

Figure 2:
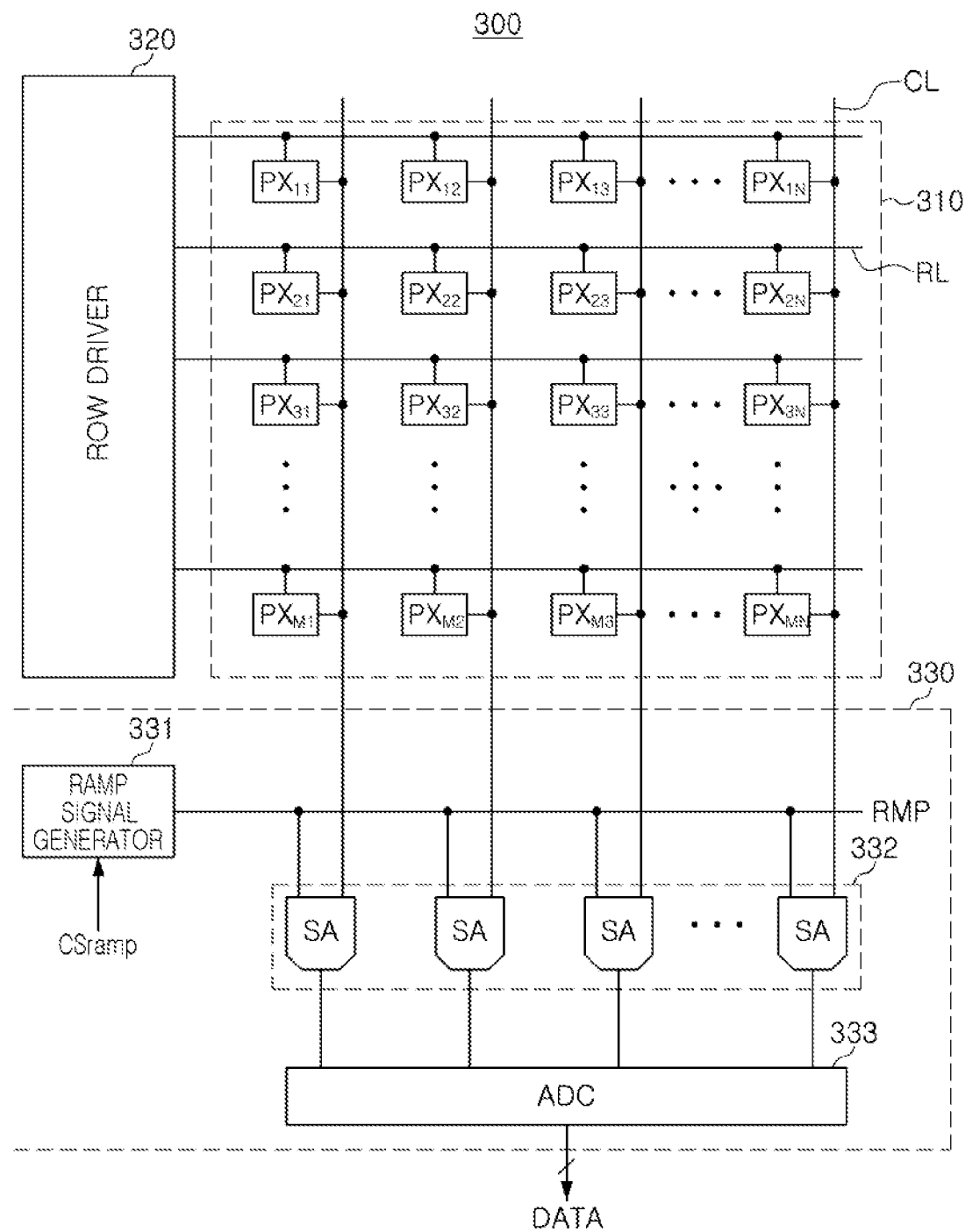
FIG. 2 is a diagram illustrating an image sensor according to an example embodiment of the present disclosure.

FIG. 2 is a diagram illustrating an image sensor according to an example embodiment.

Referring to FIG. 2, an image sensor 300 may include a pixel array 310, a row driver 320, and a read-out circuit 330.

The pixel array 310 may include a plurality of pixels PX11 to PXMN disposed at intersecting points at which a plurality of row lines RL intersect a plurality of column lines CL.

The row driver 320 may input a signal required for controlling the plurality of pixels PX11 to PXMN through the plurality of row lines RL. For example, the row driver 320 may provide a reset control signal RG, a transfer control signal TG, or a select control signal SEL to the plurality of pixels PX11 to PXMN through the plurality of row lines RL. The row driver 320 may sequentially select each of the plurality of row lines RL. The row driver 320 may select one of the plurality of row lines RL during a certain horizontal period.

The read-out circuit 330 may include a ramp signal generator 331, a sampling circuit 332, and an analog-to-digital converter 333. Data DATA output by the analog-to-digital converter 333 may be input to a column driver.

The ramp signal generator 331 may generate a ramp signal RMP in response to the ramp control signal. The ramp signal RMP may include an up-ramp signal having a voltage increasing over time, and a down-ramp signal having a voltage decreasing over time. In an example embodiment, the ramp signal generator 331 may generate a down-ramp signal to perform a sampling operation for a low illuminance pixel. Also, the ramp signal generator 331 may generate an up-ramp signal to perform a sampling operation for a high illuminance pixel. A specific example of the ramp signal generator 331 is illustrated in FIG. 3.

Figure 3:
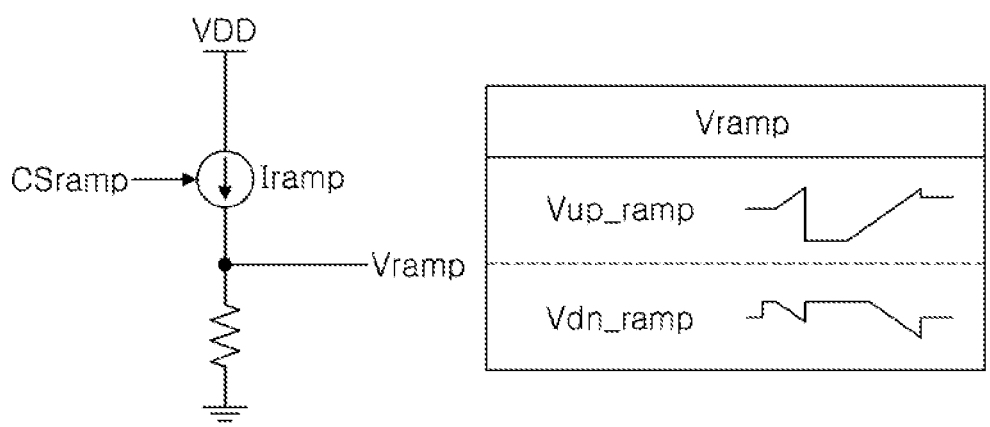
FIG. 3 is a circuit diagram illustrating a ramp signal generator included in an image sensor according to an example embodiment of the present disclosure.

Referring to FIG. 3, the ramp signal generator 331 may include a variable current source Iramp and a resistor Rramp, connected in series between a first power voltage VDD node and a second power voltage VSS node. A ramp voltage Vramp may be generated as a ramp current generated by the variable current source Iramp flows in the resistor Rramp. The ramp signal generator 331 may generate an up-ramp signal Vup_ramp or a down-ramp signal Vdn_ramp by adjusting a magnitude of a ramp current in response to a ramp control signal CSramp. FIG. 3 illustrates an example in which the ramp signal generator 331 includes the variable current source Iramp and the resistor Rramp, but an example embodiment thereof is not limited thereto. The ramp signal generator 331 may include a constant current source and a variable resistor. Also, waveforms of the up-ramp signal Vup_ramp or the down-ramp signal Vdn_ramp may be varied, differently from the examples illustrated in FIG. 3.

Referring back to FIG. 2, the sampling circuit 332 may obtain a reset signal and an image signal from the plurality of pixels PX11 to PXMN. The sampling circuit 332 may include a plurality of samplers SA, and the plurality of samplers SA may be correlated double samplers CDS. Each of the plurality of samplers SA may receive a ramp signal RMP from the ramp signal generator 331 through a first node, and may receive a reset signal and an image signal from the plurality of pixels PX11 to PXMN through a second node. Each of the plurality of samplers SA may compare each of a reset signal and an image signal with the ramp signal RMP, and may output a comparison signal as a result of the comparison.

The analog-to-digital converter 333 may output image data DATA by converting the comparison signal output from the sampling circuit 332 into a digital signal.

Figure 4:
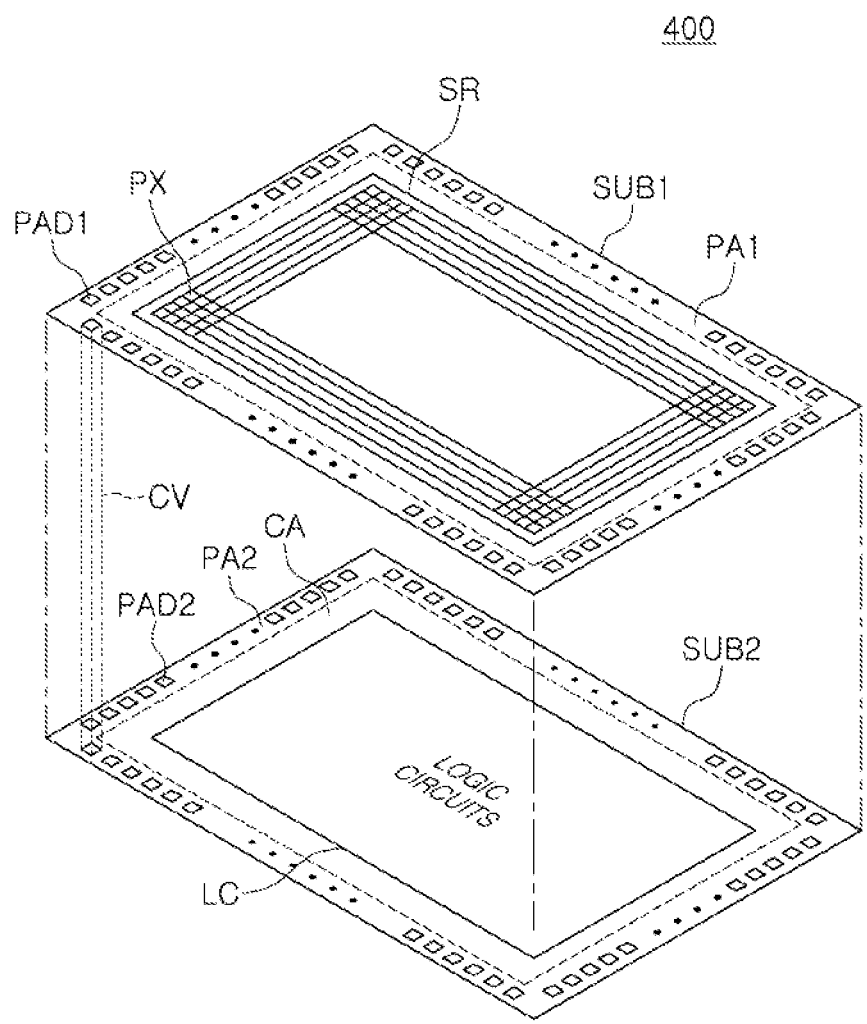
FIG. 4 is a diagram illustrating a layout of an image sensor according to an example embodiment of the present disclosure.

FIG. 4 is a diagram illustrating a layout of an image sensor according to an example embodiment.

Referring to FIG. 4, an image sensor 400 may be a stack-type image sensor 400 including a first substrate SUB1 and a second substrate SUB2 stacked in a vertical direction. The first substrate SUB1 may include a sensing region SR and a first pad region PA1, and the second substrate SUB2 may include a circuit region CA and a second pad region PA2.

The sensing region SR may include a plurality of pixels PX arranged along a plurality of row lines and a plurality of column lines. A plurality of first pads PAD1 may be included in the first pad region PA1, and the plurality of first pads PAD1 may be configured to transmit an electrical signal to and receive an electrical signal from the circuit region CA and the second pad region PA2 of the second substrate SUB2.

The circuit region CA may include a logic circuit block LC, and may include a plurality of circuit devices included in a row driver, a read-out circuit, a column driver, and the like. The circuit region CA may provide a plurality of control signals to the sensing region SR and may control an output from the plurality of pixels PX. The plurality of first pads PAD1 disposed in the first pad region PA1 may be electrically connected to second pads PAD2 disposed in the second pad region PA2 by a connection portion CV.

A layout of the image sensor 400 is not limited to the example illustrated in FIG. 3, and may be varied in example embodiments. For example, the image sensor 400 may further include at least one substrate arranged below the second substrate SUB2 and including a memory chip such as a DRAM, SRAM, or the like.

Figure 5:
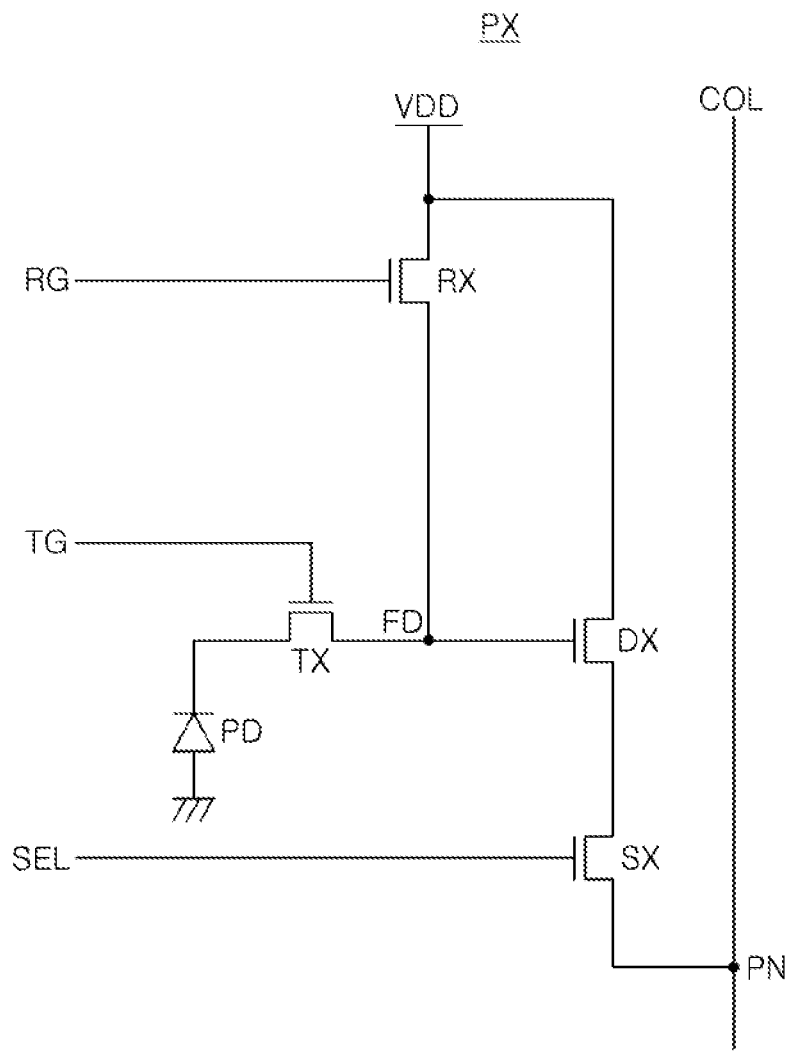
FIG. 5 is a circuit diagram illustrating a pixel included in an image sensor according to an example embodiment of the present disclosure.

FIG. 5 is a circuit diagram illustrating an example pixel PX included in an image sensor according to an example embodiment. The example pixel PX may include a photodiode PD and a pixel circuit. The pixel circuit may include a floating diffusion region FD, a reset transistor RX, a drive transistor DX, a select transistor SX, and a transfer transistor TX.

The photodiode PD may generate electric charge in response to incident light. Electric charge generated by the photodiode PD may be accumulated in the floating diffusion region FD.

When the reset transistor RX is turned on by a reset control signal RG, a voltage of the floating diffusion region FD may be reset to a power voltage VDD. When a voltage of the floating diffusion region FD is reset, the select transistor SX may be turned on by a select control signal SEL and a reset signal may be output to a column line COL through a pixel node PN.

When the transfer transistor TX is turned on by a transfer control signal TG after a reset voltage is output to the column line COL, electric charge generated by the photodiode PD may move to the floating diffusion region FD.

The drive transistor DX may operate as a source-follower amplifier for amplifying a voltage of the floating diffusion region FD. When the select transistor SX is turned on by the select control signal SEL, an image signal corresponding to electric charge generated by the photodiode PD may be output to the column line COL through a pixel node PN. Each of the reset signal and the image signal may be detected by a sampling circuit connected to the column line COL.

Figure 6:
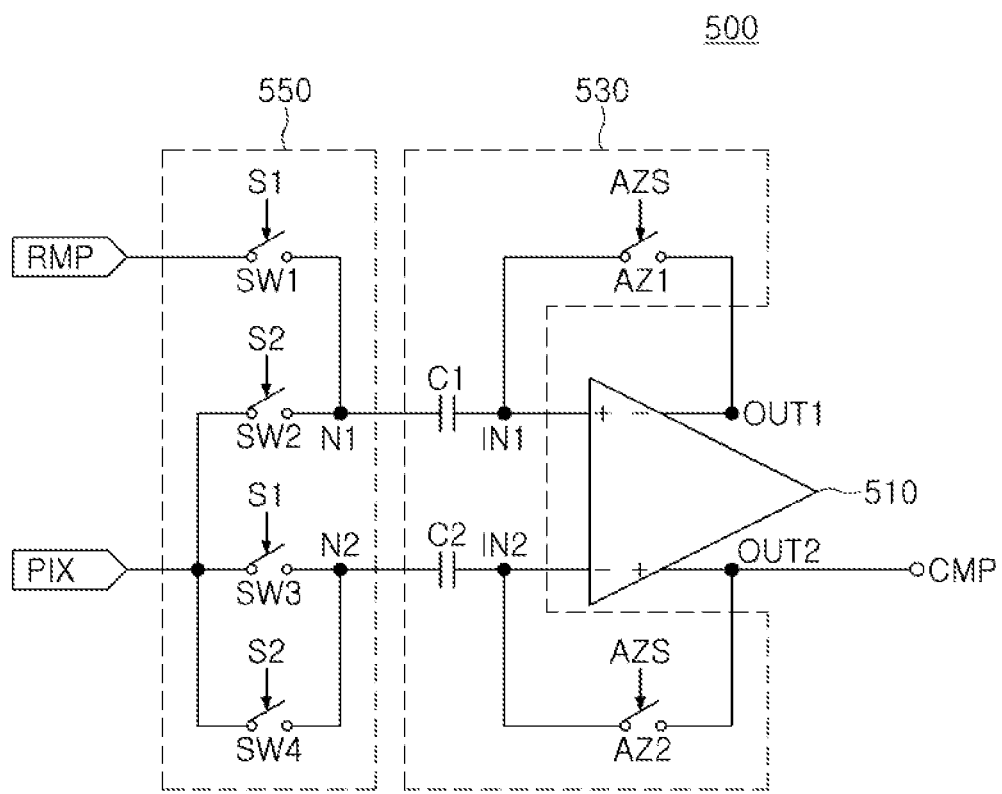
FIG. 6 is a circuit diagram illustrating a sampling circuit included in an image sensor according to an example embodiment of the present disclosure.

FIG. 6 is a circuit diagram illustrating a sampling circuit included in an image sensor according to an example embodiment.

Referring to FIG. 6, a sampling circuit 500 may include a comparator 510, a first peripheral circuit 530, and a second peripheral circuit 550. The first peripheral circuit 530 may include first and second auto-zero switches AZ1 and AZ2 and first and second capacitors C1 and C2. The second peripheral circuit 550 may include first and fourth switches SW1 to SW4.

The first switch SW1 may be connected between an input terminal of a ramp signal RMP and a first node N1. The second switch SW2 may be connected to the input terminal of a pixel signal PIX and the first node N1. The third switch SW3 and the fourth switch SW4 may be connected in parallel between the input terminal of the pixel signal PIX and a second node N2. The first switch SW1 and the third switch SW3 may be switched in response to a first control signal S1. The second switch SW2 and the fourth switch SW4 may be switched in response to a second control signal S2.

The sampling circuit 500 may receive a ramp signal RMP and a pixel signal PIX according to switching operations of the first and fourth switches SW1 to SW4, and may perform a sampling operation and may output a result of comparison between the ramp signal RMP and the pixel signal PIX. In an example embodiment, the sampling circuit 500 may perform a correlated double sampling operation and may output a result of the comparison between the ramp signal RMP and the pixel signal PIX.

The ramp signal RMP may include a down-ramp signal having a voltage decreasing over time and an up-ramp signal having a voltage increasing over time. In an example embodiment, the down-ramp signal may be input to the comparator 510 to perform a sampling operation for a low illuminance pixel. Also, the up-ramp signal may be input to the comparator 510 to perform a sampling operation for a high illuminance pixel.

A pixel signal PIX may be an analog signal output through a column line of a pixel array, and may include a reset signal corresponding to a certain power voltage and an image signal corresponding to electric charge generated by an photoelectric conversion element.

Depending on switching states of the first and fourth switches SW1 to SW4, various combinations of signals may be input to a comparator 410. In an example embodiment, a ramp signal RMP and a pixel signal PIX may be input to the comparator 510 to perform a sampling operation for a low illuminance pixel. Also, to perform a sampling operation for a high illuminance pixel, only the pixel signal PIX may be input to the comparator 510 in an auto-zero time period, and the ramp signal RMP and the pixel signal PIX may be input to the comparator 510 in a comparison time period (hereafter, just "period" or "interval").

A first capacitor C1 may be connected between a first node N1 and a first input node IN1 of the comparator 410, and a second capacitor C2 may be connected between a second node N2 and a second input node IN2 of the comparator 510. The ramp signal RMP or the pixel signal PIX may be input to the first input node IN1 of the comparator 510 through the first capacitor C1. Also, the pixel signal PIX may be input to the second input node IN1 of the comparator 510 through the second capacitor C2.

The comparator 510 may compare the ramp signal RMP with the pixel signal PIX, input through the first capacitor C1 and the second capacitor C2, and may output a comparison signal CMP through a second output node OUT2 as a result of the comparison. In an example embodiment, the comparator 410 may be a differential amplifier, and may be implemented by an operational transconductance amplifier (OTA), an operational amplifier, or the like.

A first auto-zero switch AZ1 may be connected between the first input node IN1 of the comparator 510 and a first output node OUT1. A second auto-zero switch AZ2 may be connected between a second input node IN2 of the comparator 510 and a second output node OUT2. The first and second auto-zero switches AZ1 and AZ2 may be switched in response to an auto-zero control signal AZS. The comparator 510 may be initialized while the first and second auto-zero switches AZ1 and AZ2 are turned on in an auto-zero time period of the comparator 510 operation.

The sampling circuit 500 may operate in a first mode with respect to a low illuminance pixel and may perform a single initialization process. Reset noise generated in the initialization process may be removed in a process of calculating a difference between a counter value obtained from a reset signal and a counter value obtained from an image signal. The sampling circuit 500 may operate in a second mode with respect to a high illuminance pixel and may perform a plurality of initialization processes. Although reset noise generated in the plurality of initialization processes may not be removed, since gain (e.g., xl) applied to a high illuminance pixel may be relatively low, an effect thereof impacting a comparison result may be insignificant and ignorable. Examples of the comparator 510 and the first peripheral circuit 530 are illustrated in FIG. 7.

Figure 7:
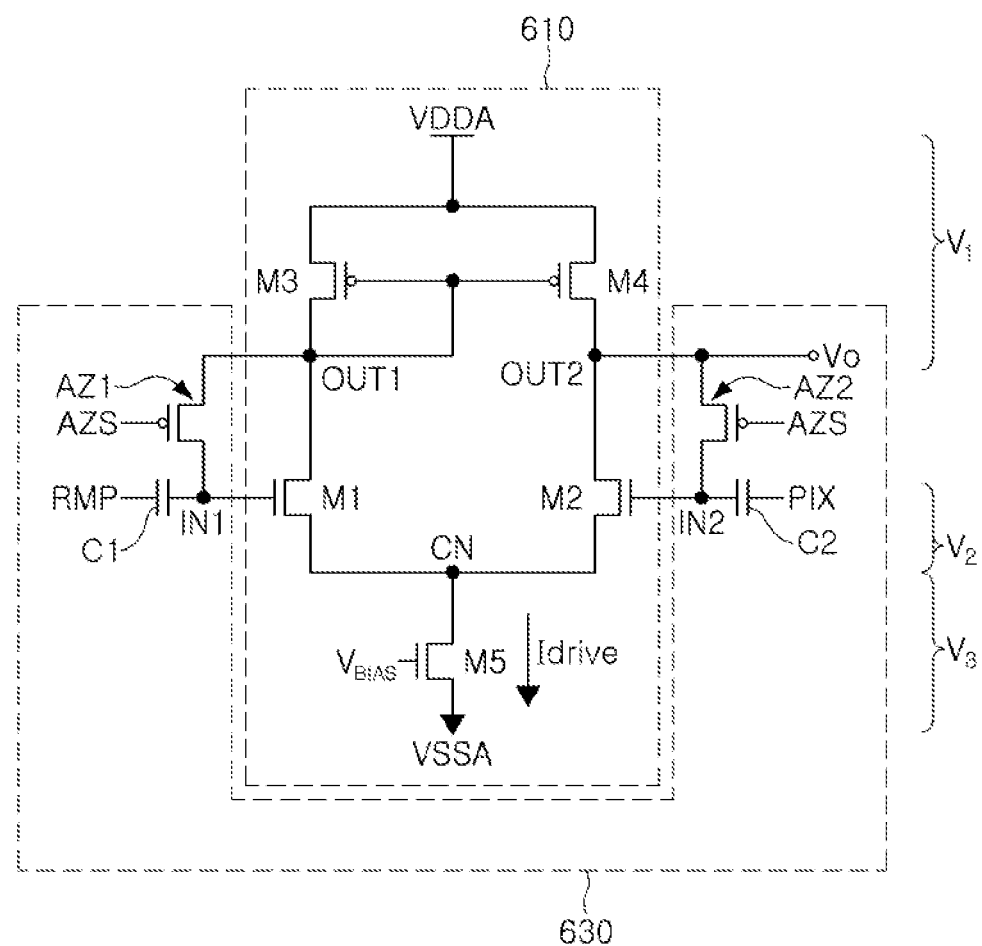
FIG. 7 is a circuit diagram illustrating a comparator and a first peripheral circuit of the sampling circuit illustrated in FIG. 6.

FIG. 7 is a circuit diagram illustrating a comparator and a first peripheral circuit of the sampling circuit illustrated in FIG. 6. Here, a comparator 610 may include first to fifth transistors M1 to M5.

The first transistor M1 may be connected between a first output node OUT1 and a common node CN, and a gate of the first transistor M1 may be connected to a first input node IN1. Second transistor M2 may be connected between a second output node OUT2 and the common node CN, and a gate of the second transistor M2 may be connected to a second input node IN2. Third transistor M3 may be connected between a first power voltage VDDA node and the first output node OUT1. Fourth transistor M4 may be connected between the first power voltage VDDA node and the second output node OUT2.

A gate of the third transistor M3 and a gate of the fourth transistor M4 may be connected to the first output node OUT1. The third transistor M3 and the fourth transistor M4 may be included in a current mirror circuit.

In an example embodiment, the first transistor M1 and the second transistor M2 may be implemented as NMOS transistors, and the third transistor M3 and the fourth transistor M4 may be implemented as PMOS transistors. Alternatively, the first transistor M1 and the second transistor M2 may be implemented as PMOS transistors, and the third transistor M3 and the fourth transistor M4 may be implemented as NMOS transistors.

A fifth transistor M5 may be connected between the common node CN and a second power voltage VSSA node. The second power voltage VSSA may be a voltage having a voltage level lower than that of the first power voltage VDDA, e.g., a ground voltage.

The fifth transistor M5 may operate as a current source for the comparator 510. For example, the fifth transistor M5 may receive a certain bias voltage VBIAS through a gate and may generate a driving current Idrive corresponding to a sum of a first current and a second current, flowing through the first transistor M1 and the second transistor M2, respectively.

A first peripheral circuit 630 may include first and second auto-zero switches AZ1 and AZ2 and first and second capacitors C1 and C2.

The first auto-zero switch AZ1 may be connected between the first output node OUT1 and the first input node IN1. The second auto-zero switch AZ2 may be connected between the second output node OUT2 and the second input node IN2. The first and second auto-zero switches AZ1 and AZ2 may be implemented as transistors turned on in response to an auto-zero control signal AZS input through each gate. For example, the first and second auto-zero switches AZ1 and AZ2 may be implemented as PMOS transistors.

The first capacitor C1 may be connected between the first node N1 to which the ramp signal RMP or the pixel signal PIX are selectively input, and a first input node IN1. The second capacitor C2 may be connected between a second node N2 to which the pixel signal PIX is input and a second input node IN2.

As a result of comparing the ramp signal RMP with the pixel signal PIX, a comparison signal CMP may be output through a second output node OUT2.

When a second power voltage VSSA is a ground voltage, a first power voltage VDDA may have a voltage level equal to or higher than a sum of first to third voltages V1 to V3 and a swing width Vsig of the pixel signal PIX to drive the comparator 610. The first voltage V1 may be source-gate voltages (Vsg, M3 and M4) of each of the third and fourth transistors M3 and M4 to allow a current to flow in the fifth transistor M5. The second voltage V2 may be source-gate voltages (Vsg, M1 and M2) of each of the first and second transistors M1 and M2 to allow a current to flow in the fifth transistor M5. The third voltage V3 may be a drain-source voltage (Vds, M5) of the fifth transistor M5 to maintain the fifth transistor M5 to be in a saturated state. For example, when the first voltage V1 is 0.8 V, the second voltage V2 is 0.5 V, the third voltage V3 is 0.3 V, and the swing width Vsig of the pixel signal PIX is 1 V, the first power voltage VDDA may have a voltage level of equal to or higher than 2.6 V to drive the comparator 510.

In the auto-zero time period in which the first and second auto-zero switches AZ1 and AZ2 are turned on, voltage levels of the first input node IN1, the second input node IN2, the first output node OUT1, and the second output node OUT2 may be initialized to a certain value. For example, in the example in which the first power voltage VDDA has a voltage level of 2.6 V or higher, a voltage level of the first input node IN1 may be initialized to VDDA-0.8 V through the auto-zero operation. As the auto-zero control signal AZS has a voltage level the same as that of the first power voltage VDDA, when the ramp signal RMP increases by 1 V the same as the swing width Vsig of the pixel signal PIX, a charge overflow phenomenon in which electric charge accumulated in the first capacitor C1 moves to the first output node OUT1 may occur. As the charge overflow phenomenon may increase random noise and a pixel settling time, this may impede implementation of a high frame rate (HFR) video capture. To address the above-described issue, the image sensor in the example embodiment may perform the auto-zero operation for each of the reset signal and the image signal in the sampling operation for a high illuminance pixel such that the charge overflow phenomenon may be prevented, and a headroom voltage corresponding to a driving current flowing in the fifth transistor M5 may decrease, thereby reducing power consumption.

In the auto-zero period in which the first and second auto-zero switches AZ1 and AZ2 are turned on, voltage levels of the first input node IN1, the second input node IN2, the first output node OUT1, and the second output node OUT2 may be the same. In this case, voltages of the first input node IN1, the second input node IN2, the first output node OUT1, and the second output node OUT2 may be referred to as auto-zero voltages. Also, in the auto-zero period, a voltage of the common node CN may be referred to as a saturated voltage, and may be varied depending on a characteristic of the fifth transistor M5. An input range of the comparator 610 may be determined according to the auto-zero voltage and the saturated voltage.

Figure 8:
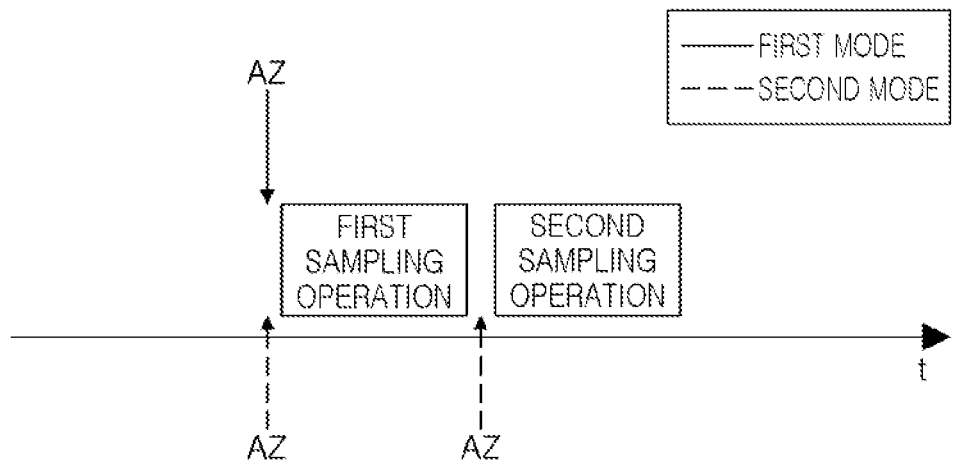
FIG. 8 is a diagram illustrating an operation method of a sampling circuit according to an example embodiment of the present disclosure.

FIG. 8 is a diagram illustrating an operation method of a sampling circuit according to an example embodiment.

Referring to FIG. 8 with reference to FIG. 6, a sampling circuit 500 may perform a sampling operation for a reset signal and an image signal in sequence. For example, the sampling circuit 500 may perform a first sampling operation for a reset signal, and may perform a second sampling operation for an image signal.

In an example embodiment, the sampling circuit 500 may perform the sampling operation with different gains for a high illuminance pixel and a low illuminance pixel. The sampling circuit 500 may perform a first sampling operation with a first gain for a low illuminance pixel in a first mode. The sampling circuit 500 may perform a second sampling operation with a second gain lower than the gain for a high illuminance pixel in a second mode. In other words, the first mode may be a mode for measuring illuminance of a pixel PX within a first range corresponding to a low illuminance state of the pixel PX, and the second mode may be a mode for measuring the illuminance of the pixel PX within a second range corresponding to a high illuminance state of the pixel PX.

The sampling circuit 500 may control an auto-zero operation AZ differently depending on an operation mode. In an example embodiment, the sampling circuit 500 may perform an auto-zero operation AZ only one time before performing a first sampling operation in the first mode. Also, in the second mode, the sampling circuit 500 may perform the auto-zero operation AZ two times by performing the auto-zero operation AZ before performing the first sampling operation and before performing the second sampling operation. As the auto-zero operation AZ may be performed one time in the first mode, the auto-zero operation AZ may be referred to as a single auto-zero operation. Also, as the auto-zero operation AZ is performed two times in the second mode, the auto-zero operation AZ may be referred to as a dual auto-zero operation.

The sampling circuit 500 may secure accuracy in a result of comparison between a ramp signal and a pixel signal by performing the single auto-zero operation in the first mode in which the sampling circuit 500 operates with a relatively high first gain. Also, the sampling circuit 500 may reduce power consumption by reducing a headroom voltage corresponding to a driving current by performing the dual auto-zero operation in the second mode in which the sampling circuit 500 operates with the second gain smaller than the first gain.

Figure 9:
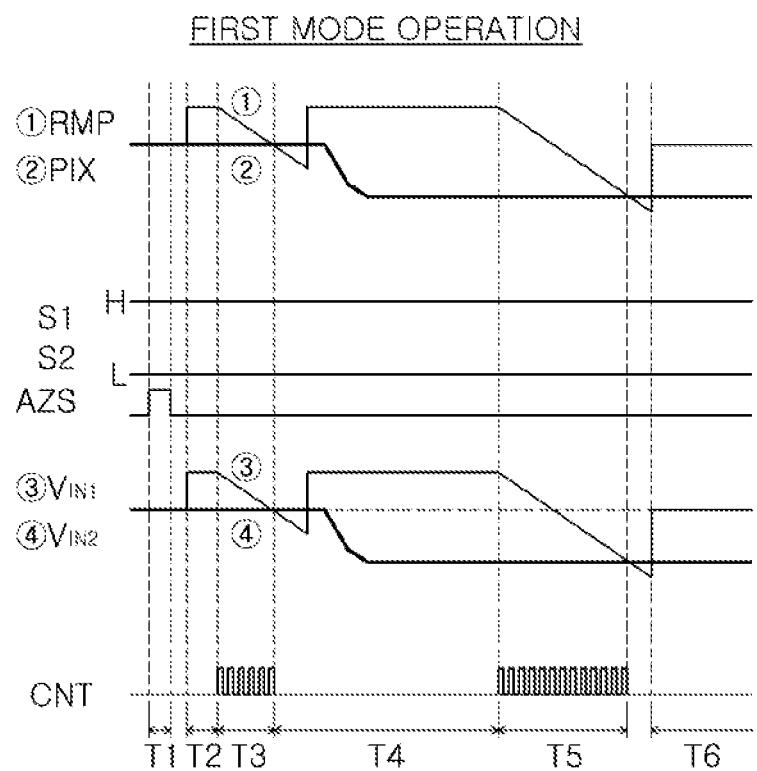
FIG. 9 is a timing diagram illustrating an example in which a sampling circuit operates in a first mode.

FIG. 9 is a timing diagram illustrating an example in which a sampling circuit operates in a first mode.

Referring to FIG. 9 with reference to FIG. 6, as a first control signal S1 is activated and a second control signal S2 is inactivated, first and third switches SW1 and SW3 may be turned on and second and fourth switches SW2 and SW4 may be turned off. In an example embodiment, the first control signal S1 and the second control signal S2 may be activated when having a high logic value H, and may be inactivated when having a low logic value L. As the first and third switches SW1 and SW3 are turned on, a ramp signal RMP may be input to a first input node IN1 of a comparator 510 through the first capacitor C1, and a pixel signal PIX may be input to the second input node IN2 through a second capacitor C2.

As an auto-zero control signal AZS is activated in the first time period T1, the sampling circuit 500 may perform an auto-zero operation. In an example embodiment, the auto-zero control signal AZS may be activated when having a high logic value H, and may be inactivated when having a low logic value L. The sampling circuit 500 may be initialized by performing an auto-zero operation.

A voltage VIN1 of the first input node IN1 of the comparator 510 may be the same as a voltage of the ramp signal RMP. Also, a voltage VIN2 of the second input node IN2 of the comparator 510 may be the same as a voltage of the pixel signal PIX. The pixel signal PIX input to the comparator 510 in the first period T1 may be a reset signal, and may have a voltage level the same as an initial voltage of the ramp signal RMP.

In a second time period T2, an offset may be added to the ramp signal RMP. Thereafter, the ramp signal RMP may decrease to have a certain slope. By counting a third period T3 from a time point at which the ramp signal RMP decreases to a time point at which the ramp signal RMP is lower than the pixel signal PIX using a certain clock signal, analog-digital conversion for a reset signal may be performed.

In a fourth period T4, the ramp signal RMP may have a voltage level the same as a level of voltage in the second period T2. An image signal may be input to the comparator 410 as the pixel signal PIX, and the image signal may have a voltage level lower than an initial voltage of the ramp signal RMP. A voltage difference between the image signal and the initial voltage of the ramp signal RMP may correspond to the amount of electric charge generated by a photodiode.

Thereafter, the ramp signal RMP may decrease to have a certain slope. By counting a fifth period T5 from a time point at which the ramp signal RMP decreases to a time point at which the ramp signal RMP is lower than the pixel signal PIX using a certain clock signal, analog-digital conversion for the image signal may be performed. Also, in a sixth period T6, the ramp signal RMP may be initialized for a subsequent sampling operation.

The image sensor in the example embodiment may generate image data by calculating a difference between a counter value of the fifth period T5 corresponding to a digital value of the image signal and a counter value of the second period T2 corresponding to a digital value of the reset signal.

Meanwhile, the first period T1 may be referred to as an auto-zero period, and the second to sixth periods T2 to T6 may be referred to as comparison periods. In the description below, a connection relationship in the sampling circuit 500 in the auto-zero period and the comparison period in the first mode will be described.

Figure 10A:
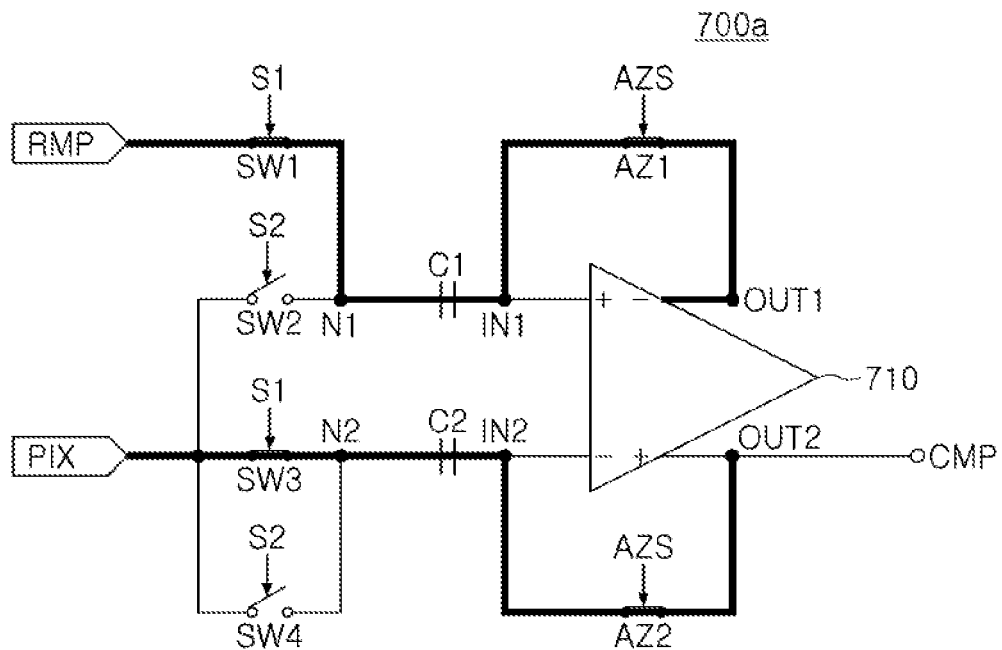
FIG. 10A is a diagram illustrating a state of a sampling circuit in an auto-zero period when the sampling circuit operates in a first mode according to an example embodiment of the present disclosure.

FIG. 10A is a diagram illustrating a state of a sampling circuit in an auto-zero period when the sampling circuit operates in a first mode according to an example embodiment. 10B is a diagram illustrating a state of a sampling circuit in a comparison period when the sampling circuit operates in a first mode according to an example embodiment. The configurations and the functions of a sampling circuit 700a in FIG. 10A and a sampling circuit 700b in FIG. 10B may be the same as those of the sampling circuit 500 in FIG. 6, and overlapping descriptions will thus not be provided.

Referring to FIG. 10A, as first and third switches SW1 and SW3 are turned on in an auto-zero period in a first mode, a ramp signal RMP may be input to a first input node IN1 of a comparator 710 through a first capacitor C1, and a pixel signal PIX may be input to a second input node IN2 through a second capacitor C2. Also, the comparator 710 may be initialized as the first and second auto-zero switches AZ1 and AZ2 are turned on.

Figure 10B:
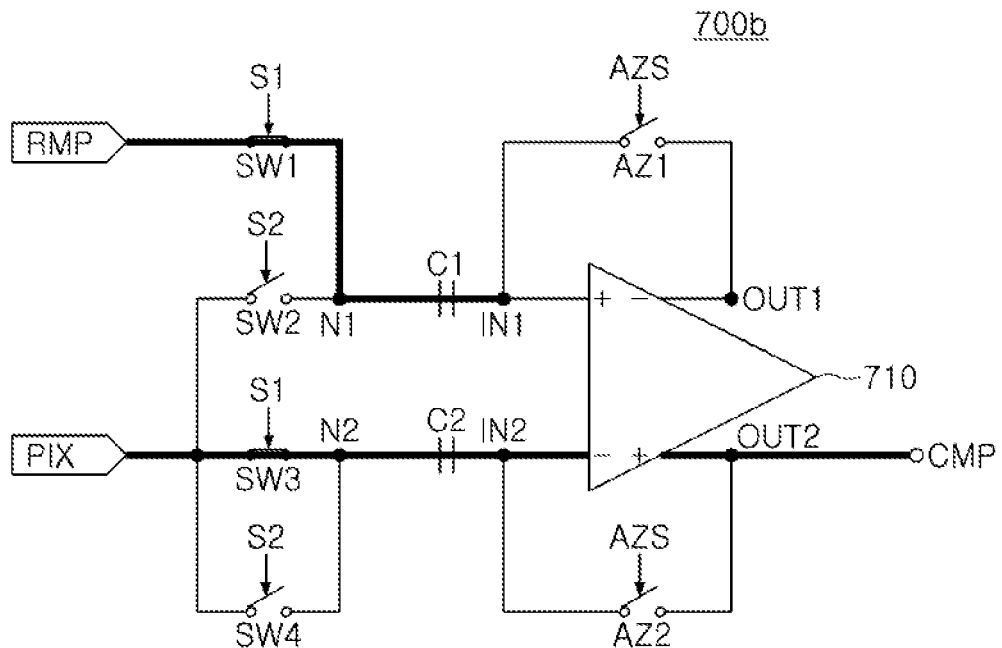
FIG. 10B is a diagram illustrating a state of a sampling circuit in a comparison period when the sampling circuit operates in a first mode according to an example embodiment of the present disclosure.

Referring to FIG. 10B, as the first and third switches SW1 and SW3 are turned on in a comparison period in the first mode, a ramp signal RMP may be input to the first input node IN1 of the comparator 710 through a first capacitor C1, and a pixel signal PIX may be input to the second input node IN2 through the second capacitor C2. Also, as the first and second auto-zero switches AZ1 and AZ2 are turned off, the comparator 710 may output a comparison signal CMP obtained by comparison between the ramp signal RMP and the pixel signal PIX through the second output node OUT2.

Figure 11:
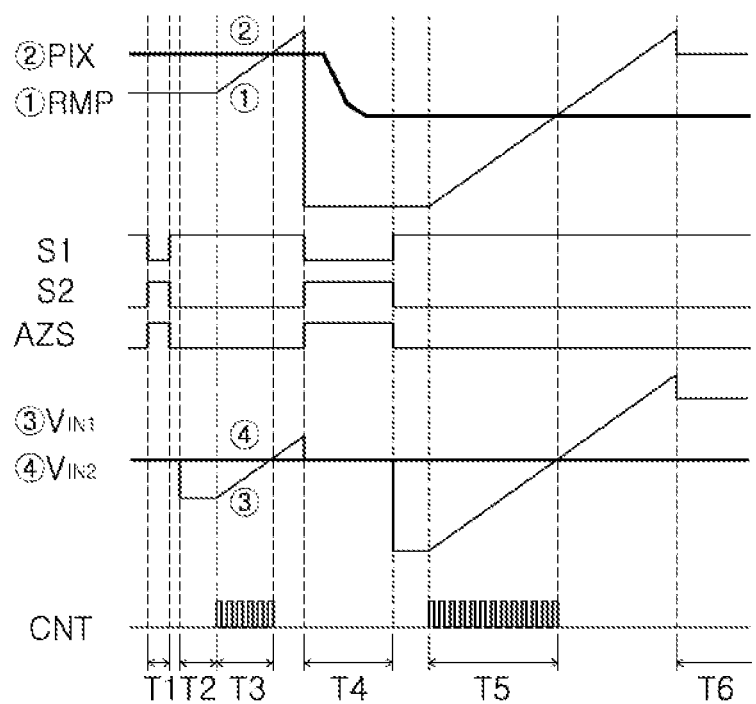
FIG. 11 is a timing diagram illustrating an example in which a sampling circuit operates in a second mode.

FIG. 11 is a timing diagram illustrating an example in which a sampling circuit operates in a second mode.

Referring to FIG. 11 with reference to FIG. 6, as an auto-zero control signal AZS is activated in a first period T1, a sampling circuit 500 may perform a first auto-zero operation. The sampling circuit 500 may be initialized through the first auto-zero operation.

Also, as a first control signal S1 is inactivated and a second control signal S2 is activated, first and third switches SW1 and SW3 may be turned off, and second and fourth switches SW2 and SW4 may be turned on. As the second and fourth switches SW2 and SW4 are turned on, a pixel signal PIX may be input to first and second input nodes IN1 and IN2 of the comparator 510 through first and second capacitors C1 and C2. Accordingly, a voltage VIN1 of the first input node IN1 of the comparator 510 and a voltage VIN2 of the second input node IN2 may be the same as a voltage of the pixel signal PIX. The pixel signal PIX input to the comparator 510 in the first period T1 may be a reset signal, and may have a voltage level higher than that of the ramp signal RMP. A voltage difference between the pixel signal PIX and the ramp signal RMP may be considered as an offset of the ramp signal RMP.

In the second period T2, as the first control signal S1 is activated, and the second control signal S2 is inactivated, the first and third switches SW1 and SW3 may be turned on and the second and fourth switches SW2 and SW4 may be turned off. As the first and third switches SW1 and SW3 are turned on, a ramp signal RMP may be input to the first input node IN1 of the comparator 710 through a first capacitor C1, and a pixel signal PIX may be input to the second input node IN2 through the second capacitor C2. Accordingly, a voltage VIN1 of the first input node IN1 of the comparator 510 may become the same as a voltage of the ramp signal RMP, and a voltage VIN2 of the second input node IN2 may become the same as a voltage of the pixel signal PIX.

Thereafter, the ramp signal RMP may increase to have a certain slope. By counting a third period T3 from a time point at which the ramp signal RMP increases to a time point at which the ramp signal RMP is greater than the pixel signal PIX using a certain clock signal, analog-digital conversion for a reset signal may be performed.

As the auto-zero control signal AZS is activated in the fourth period T4, a sampling circuit 400 may perform a second auto-zero operation. The sampling circuit 500 may be reinitialized through the second auto-zero operation. Also, as the first control signal S1 is inactivated and the second control signal S2 is activated, the first and third switches SW1 and SW3 may be turned off and the second and fourth switches SW2 and SW4 may be turned on. As the second and fourth switches SW2 and SW4 are turned on, a pixel signal PIX may be input to the first and second input nodes IN1 and IN2 of the comparator 510 through the first and second capacitors C1 and C2. In the fourth period T4, the ramp signal RMP may have a voltage level lower than an initial voltage. An image signal may be input to the comparator 510 as a pixel signal PIX, and a decrease of voltage of the pixel signal PIX caused by the input of the image signal may be considered as an offset of the ramp signal RMP.

Thereafter, the ramp signal RMP may increase again to have a certain slope. By counting a fifth period T5 from a time point at which the ramp signal RMP increases to a time point at which the ramp signal RMP is greater than the pixel signal PIX using a certain clock signal, analog-digital conversion for the image signal may be performed. Also, in the sixth period T6, the ramp signal RMP may be initialized for a subsequent sampling operation.

The image sensor in the example embodiment may generate image data by calculating a difference between a counter value of the fifth period T5 corresponding to a digital value of the image signal and a counter value of the third period T3 corresponding to a digital value of a reset signal. As the sampling circuit 500 performs a sampling operation using an up-ramp signal, in an example embodiment, image data may be generated by deducting a difference between a counter value corresponding to the image signal and a counter value corresponding to the reset signal from 2n (n is a resolution of an analog-digital converter).

The first period T1 and the fourth period T4 may be referred to as auto-zero periods, and the second, third, fifth, and sixth periods T2, T3, T5, and T6 may be referred to as comparison periods. In the description below, a connection relationship in the sampling circuit 500 in the auto-zero period and the comparison period in the second mode will be described.

Figure 12A:
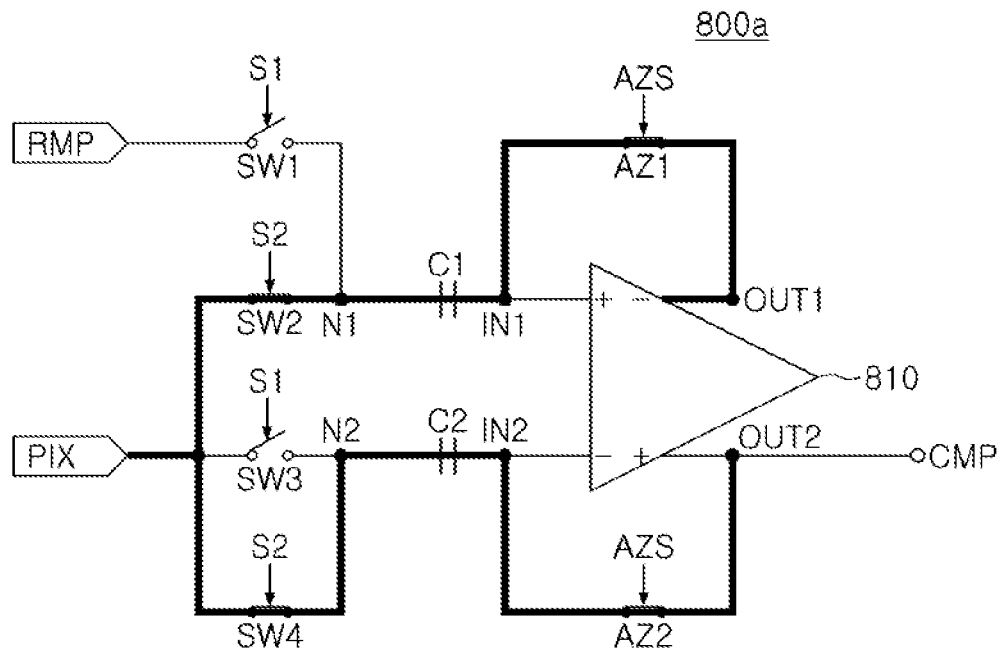
FIG. 12A is a diagram illustrating a state of a sampling circuit in an auto-zero period when the sampling circuit operates in a second mode according to an example embodiment of the present disclosure.
Figure 12B:
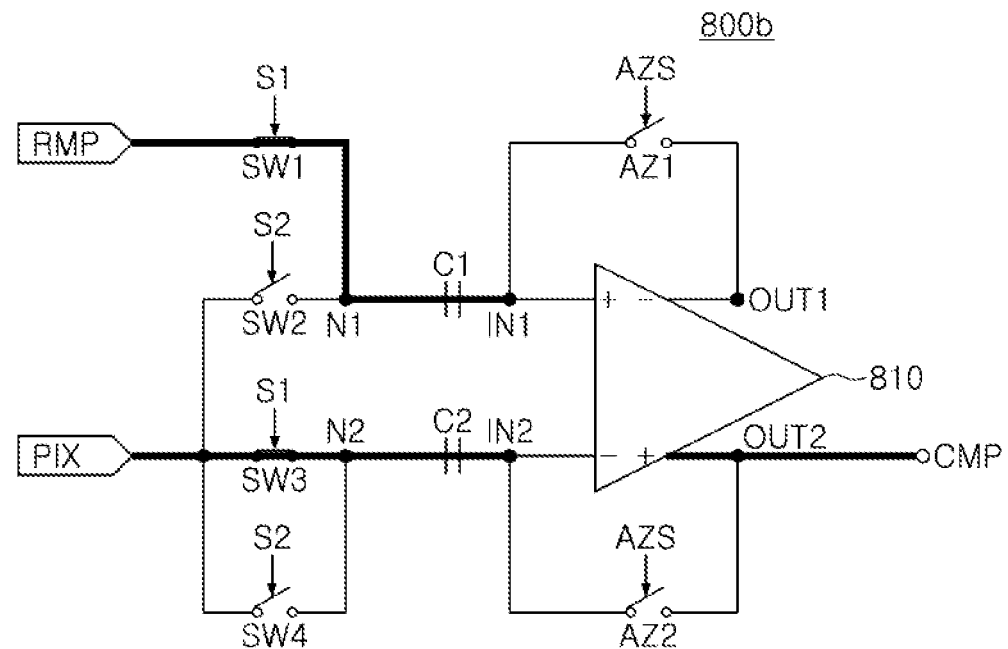
FIG. 12B is a diagram illustrating a state of a sampling circuit in a comparison period when the sampling circuit operates in a second mode according to an example embodiment of the present disclosure.

FIG. 12A is a diagram illustrating a state of a sampling circuit in an auto-zero period when the sampling circuit operates in a second mode according to an example embodiment, and FIG. 12B is a diagram illustrating a state of a sampling circuit in a comparison period when the sampling circuit operates in a second mode according to an example embodiment. The configurations and the functions of a sampling circuit 800a in FIG. 12A and a sampling circuit 800*b* in FIG. 12B may be the same as those of the sampling circuit 500 in FIG. 6, and overlapping descriptions will thus not be provided.

Referring to FIG. 12A, as a first control signal S1 is inactivated and a second control signal S2 is activated in an auto-zero period in a second mode, first and third switches SW1 and SW3 may be turned off and second and fourth switches SW2 and SW4 may be turned on. As the second and fourth switches SW2 and SW4 are turned on, a pixel signal PIX may be input to first and second input nodes IN1 and IN2 of a comparator 810 through first and second capacitors C1 and C2. Also, the comparator 810 may be initialized as the first and second auto-zero switches AZ1 and AZ2 are turned on.

Referring to FIG. 12B, as the first and third switches SW1 and SW3 are turned on in a comparison period in the second mode, a ramp signal RMP may be input to the first input node IN1 of the comparator 810 through a first capacitor C1, and a pixel signal PIX may be input to the second input node IN2 through the second capacitor C2. Also, as the first and second auto-zero switches AZ1 and AZ2 are turned off, the comparator 810 may output a comparison signal CMP obtained by comparison between the ramp signal RMP and the pixel signal PIX.

The image sensor described in the aforementioned example embodiment may remove reset noise and may secure accuracy in the comparison operation by performing the single auto-zero operation in a sampling operation (a first mode) for a low illuminance pixel. The image sensor may also reduce power consumption by reducing a headroom voltage corresponding to a driving current by performing the dual auto-zero operation in a sampling operation (a second mode) for a high illuminance pixel. In the description below, example embodiments in which each pixel in an image sensor includes two photodiodes will be described in greater detail.

Figure 13:
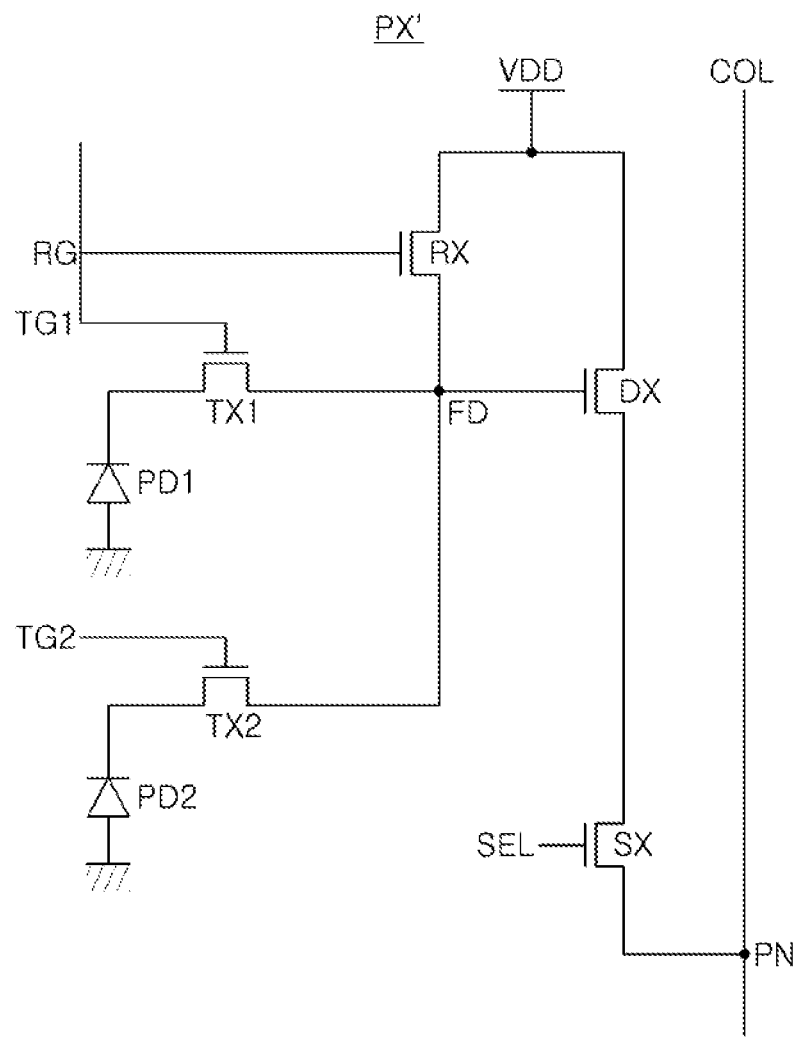
FIG. 13 is a circuit diagram illustrating a pixel included in an image sensor according to an example embodiment of the present disclosure.

FIG. 13 is a circuit diagram illustrating a pixel included in an image sensor according to an example embodiment. Here, a pixel PX' in the image sensor 100 may include two photodiodes PD1 and PD2 and a pixel circuit (the other components shown in FIG. 13). The pixel circuit may process electric charge generated by the two photodiodes PD1 and PD2 and may output an electrical signal at a node PN. The pixel circuit may include two transfer transistors TX1 and TX2, a reset transistor RX, a drive transistor DX, and a select transistor SX. The first transfer transistor TX1 may be connected to the first photodiode PD1, and the second transfer transistor TX2 may be connected to the second photodiode PD2. In the description below, the pixel PX' including the two photodiodes PD1 and PD2 may be referred to as a 2 PD pixel. In various embodiments, the two photodiodes PD1 and PD2 may be utilized for autofocusing during an autofocusing mode. During an imaging mode, photocharges from both photodiodes PD1 and PD2 may be used for realizing HDR resolution or for other purposes using the approaches disclosed herein.

The reset transistor RX may be turned on and turned off by a reset control signal RG, and when the reset transistor RX is turned on, a voltage of a floating diffusion region FD may be reset to a power voltage VDD. When a voltage of the floating diffusion region FD is reset, the select transistor SX may be turned on by a select control signal SEL, and a reset signal may be output to a column line COL.

When the first transfer transistor TX1 is turned on after a reset voltage is output to the column line COL, electric charge generated by the first photodiode PD1 being exposed to light may move to the floating diffusion region FD. The drive transistor DX may operate as a source-follower amplifier for amplifying a voltage of the floating diffusion region FD, and when the select transistor SX is turned on by the select control signal SEL, a first image signal corresponding to electric charge generated by the photodiode PD may be output to the column line COL.

When the second transfer transistor TX2 is turned on after the first image signal is output to the column line COL, electric charge generated by the second photodiode PD2 being exposed to light may move to the floating diffusion region FD. When the select transistor SX is turned on by the select control signal SEL, a second image signal corresponding to electric charge generated by the photodiode PD may be output to the column line COL.

Each of the reset signal and the first and second image signals may be detected by a sampling circuit connected to the column line COL. The sampling circuit may include a plurality of samplers, each of which has a first input terminal for receiving a ramp signal and a second input terminal receiving a reset signal and the first and second image signals.

The sampler may compare each of a reset signal and the first and second image signals with the ramp signal. An analog-digital converter (ADC) may be connected to an output terminal of the sampler. The analog-digital converter may output first image data based on a counter value corresponding to the first image signal and a counter value corresponding to the reset signal. The analog-digital converter may also output second image data based on a counter value corresponding to the second image signal and a counter value corresponding to a reset signal. Also, an image signal processor (ISP) may generate an image using the first image data and the second image data.

Figure 14:
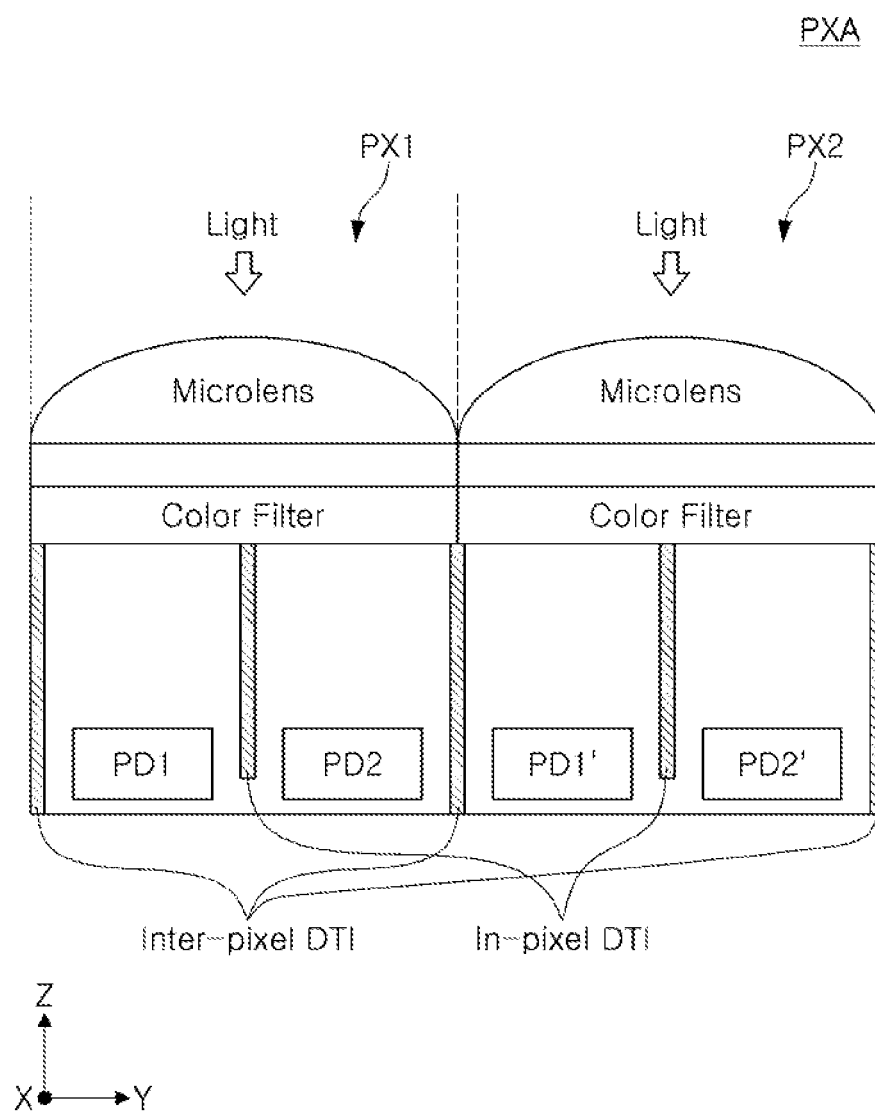
FIG. 14 is a cross-sectional diagram illustrating a vertical structure of a 2 PD pixel.

FIG. 14 is a cross-sectional diagram illustrating a vertical structure of a 2 PD pixel.

Referring to FIG. 14, each of pixels PX1 and PX2 of a pixel array PXA may include two photodiodes PD1 and PD2, and PD1' and PD2'.

Each of the pixels PX1 and PX2 may include a color filter and a microlens disposed on the two photodiodes PD1 and PD2, and PD1' and PD2', respectively.

The two photodiodes PD1 and PD2, and PD1' and PD2' may be formed in a silicon substrate, and a deep trench isolation DTI may be formed between the two photodiodes PD1 and PD2, and PD1' and PD2'. For example, an in-pixel DTI may be formed between the two photodiodes PD1 and PD2, and PD1' and PD2', and an inter-pixel DTI may be formed between the pixels PX1 and PX2.

A metal wiring, a multilayer wiring, or wiring layers may be formed in a circuit region formed between the two photodiodes PD1 and PD2, and PD1' and PD2' and a color filter. A lens buffer or a planarization layer may be formed between the microlens and the color filter.

The image sensor including the 2 PD pixel described with reference to FIGS. 13 and 14 may include a sampling circuit equivalent to the sampling circuit illustrated in FIG. 6. In the description below, a sampling operation for the 2 PD pixel will be described in detail.

Figure 15A:
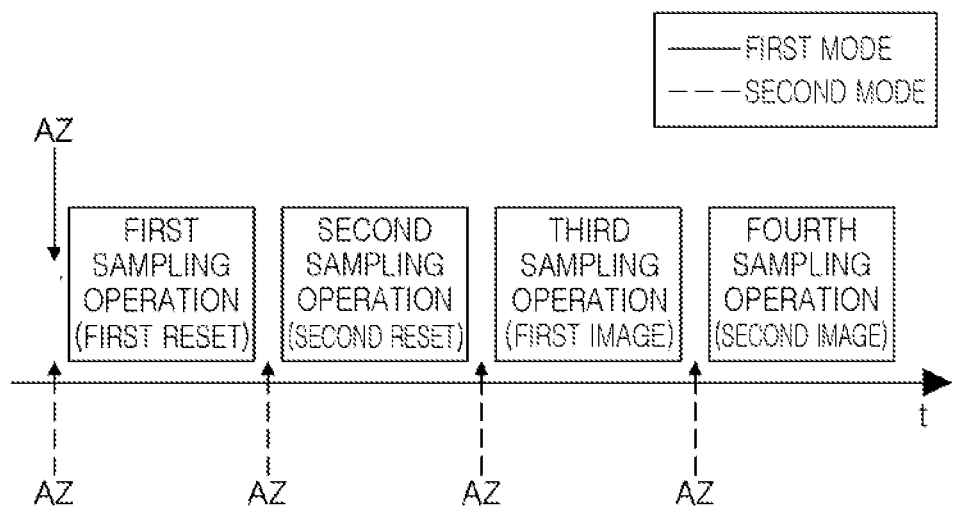
FIGS. 15A and 15B are diagrams an operation method of a sampling circuit according to an example embodiment of the present disclosure.
Figure 15B:
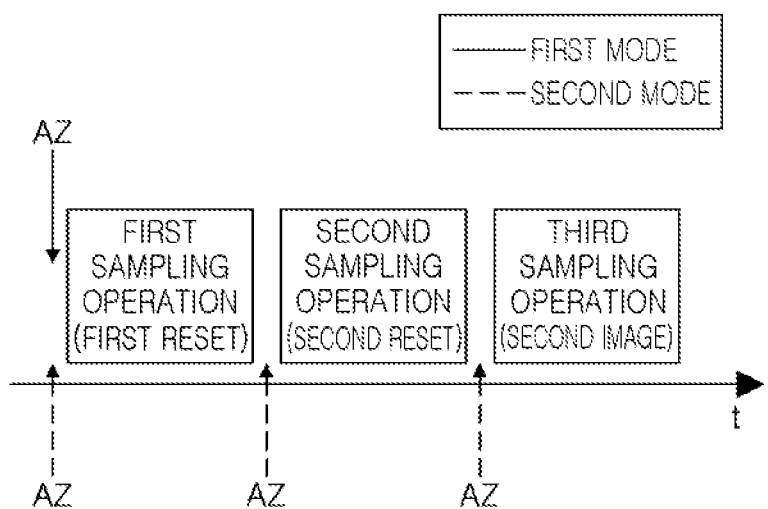

FIGS. 15A and 15B are diagrams illustrating a method of operating a sampling circuit according to an example embodiment.

Referring to FIG. 15A with reference to FIG. 6, a sampling circuit 500 may perform a sampling operation for a plurality of pixel signals of the 2 PD pixel, which are, e.g., a reset signal, a first image signal, and a second image signal, in sequence. For example, the sampling circuit 500 may perform a first sampling operation for the first reset signal, and may perform a second sampling operation for the second reset signal. Also, the sampling circuit 500 may perform a third sampling operation for the first image signal, and may perform a fourth sampling operation for the second image signal. A comparison signal generated in response to the sampling operation of the sampling circuit 500 may be monitored using a counting method to determine an analog level of each sampled signal. The analog level may be converted into a digital signal, and may be stored in a latch or a buffer. A column driver may generate image data by performing differential-calculation using count values as digital signals stored in a latch or a buffer.

In an example embodiment, the sampling circuit 500 may perform a sampling operation for a low illuminance pixel and a high illuminance pixel with different gains. In a first mode, the sampling circuit 500 may perform a first sampling operation for a low illuminance pixel with a first gain. The sampling circuit 500 may perform a second sampling operation for a high illuminance pixel with a second gain smaller than the first gain.

The sampling circuit 500 may perform an auto-zero operation AZ differently depending on an operation mode. In an example embodiment, the sampling circuit 500 may perform the auto-zero operation AZ only one time before performing a first sampling operation in a first mode. As the auto-zero operation AZ is performed only one time in the first mode, the auto-zero operation AZ may be referred to as a single auto-zero operation. In contrast to the above-described example, the sampling circuit 500 may perform the auto-zero operation AZ before performing the first to fourth sampling operations in a second mode. As the auto-zero operation AZ may be performed four times in the second mode, the auto-zero operation AZ may be referred to as a multi-auto-zero operation.

As illustrated in FIG. 15B, the sampling circuit 500 may perform a sampling operation for a reset signal, a first image signal, and a second image signal of a 2 PD pixel in sequence. Also, the sampling circuit 500 may perform the sampling operation for the reset signal only one time for each pixel illuminance measurement. For example, the sampling circuit 500 may perform a first sampling operation for a reset signal, a second operation for the first image signal, and a third sampling operation for the second image signal.

The sampling circuit 500 may perform the auto-zero operation AZ differently depending on an operation mode. In an example embodiment, the sampling circuit 500 may perform the auto-zero operation AZ only one time before performing the first sampling operation in the first mode. Differently from the above-described example, the sampling circuit 500 may perform the auto-zero operation AZ before performing the first to third sampling operations such that the sampling circuit 500 may perform the auto-zero operation AZ three times.

As illustrated in FIGS. 15A and 15B, as the sampling circuit 500 performs the single auto-zero operation in the first mode in which the sampling circuit 500 has a relatively high first gain, accuracy of a result of the comparison between a ramp signal and a pixel signal may be secured. Also, as the sampling circuit 500 performs the multi-auto-zero operation in the second mode in which the sampling circuit 500 has the second gain smaller than the first gain, a headroom voltage corresponding to a driving current may be reduced such that power consumption may be reduced.

In the description below, the first mode and the second mode of the sampling circuit will be described in greater detail on the basis of the sampling method illustrated in FIG. 15B according to an example embodiment.

Figure 16:
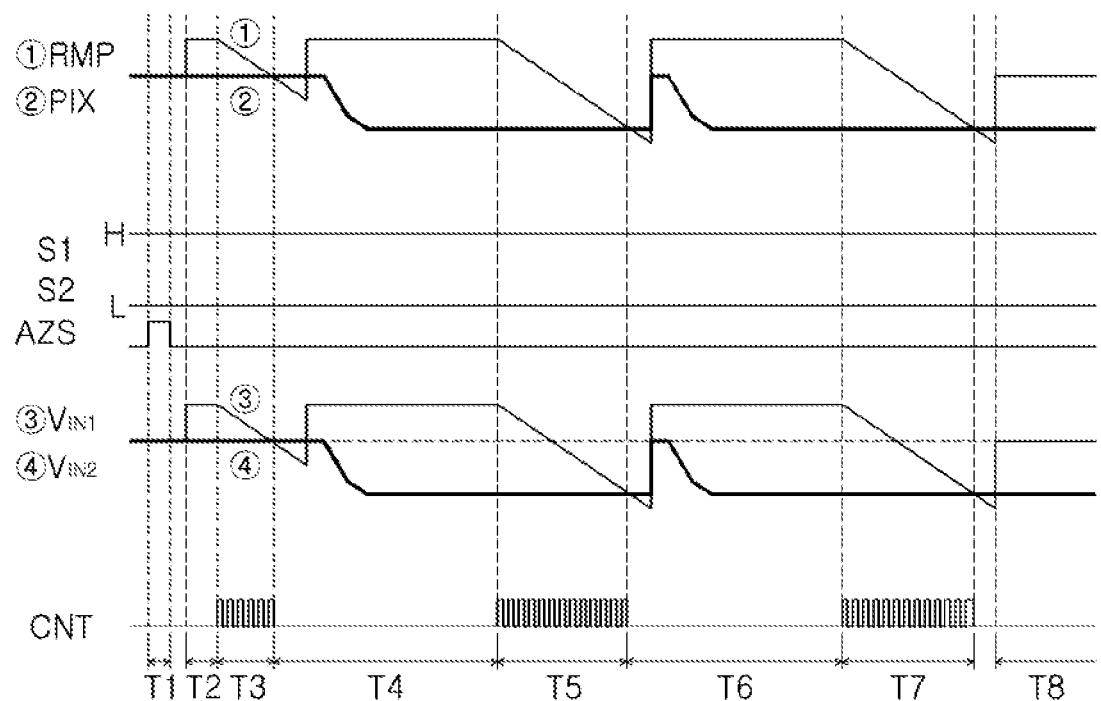
FIG. 16 is a timing diagram illustrating an example in which a sampling circuit operates in a first mode according to an example embodiment of the present disclosure.

FIG. 16 is a timing diagram illustrating an example in which a sampling circuit operates in a first mode according to an example embodiment.

Referring to FIG. 16 and FIG. 6, as a first control signal S1 is activated (e.g., to be a high logic value) and a second control signal S2 is inactivated (e.g., to be a low logic value), first and third switches SW1 and SW3 may be turned on and second and fourth switches SW2 and SW4 may be turned off. As the first and third switches SW1 and SW3 are turned on, a ramp signal RMP may be input to a first input node IN1 of a comparator 510 through a first capacitor C1, and a pixel signal PIX may be input to a second input node IN2 through a second capacitor C2.

As the auto-zero control signal AZS is activated (e.g., to be a high logic value) in a first period T1, a sampling circuit 500 may perform an auto-zero operation. The sampling circuit 500 may be initialized through the auto-zero operation.

A voltage VIN1 of the first input node IN1 of the comparator 510 may be the same as a voltage of the ramp signal RMP. Also, a voltage VIN2 of the second input node IN2 of the comparator 510 may be the same as a voltage of the pixel signal PIX. The pixel signal PIX input to the comparator 510 in the first period T1 may be a reset signal, and may have a voltage level equal to an initial voltage of the ramp signal RMP.

In a second period T2, an offset may be added to the ramp signal RMP. Thereafter, the ramp signal RMP may decrease to have a certain slope. By counting a third period T3 from a time point at which the ramp signal RMP decreases to a time point at which the ramp signal RMP is lower than the pixel signal PIX using a certain clock signal, analog-digital conversion for a reset signal may be performed.

In a fourth period T4, the ramp signal RMP may have a voltage level equal to a level of voltage in the second period T2. A first image signal may be input to the comparator 510 as the pixel signal PIX. The first image signal may be an electrical signal corresponding to electric charge generated by a first photodiode of a pixel, and may have a first voltage level lower than an initial voltage of the ramp signal RMP. A difference in initial voltages between the first image signal and the ramp signal RMP may correspond to the amount of electric charge generated by the first photodiode.

Thereafter, the ramp signal RMP may decrease to have a certain slope. By counting a fifth period T5 from a time point at which the ramp signal RMP decreases to a time point at which the ramp signal RMP is lower than the pixel signal PIX using a certain clock signal, analog-digital conversion for the first image signal may be performed.

In a sixth period T6, the ramp signal RMP may have a voltage level equal to a voltage level in the second period T2. A second image signal may be input to the comparator 510 as a pixel signal PIX. The second image signal may be an electrical signal corresponding to electric charge generated by a second photodiode of a pixel, and may have a second voltage level lower than an initial voltage of the ramp signal RMP. A difference in initial voltages between the second image signal and the ramp signal RMP may correspond to the amount of electric charge generated by the second photodiode.

Thereafter, the ramp signal RMP may decrease to have a certain slope. By counting a seventh period T7 from a time point at which the ramp signal RMP decreases to a time point at which the ramp signal RMP is lower than the pixel signal PIX using a certain clock signal, analog-digital conversion for the second image signal may be performed. Also, in an eighth period T8, the ramp signal RMP may be initialized for a subsequent sampling operation.

The image sensor in the example embodiment may generate first image data by calculating a difference between a counter value of the fifth period T5 corresponding to a digital value of the first image signal and a counter value of the second period T2 corresponding to a digital value of a reset signal. Also, the image sensor in the example embodiment may generate second image data by calculating a difference between a counter value of the seventh period T7 corresponding to a digital value of the second image signal and a counter value of the second period T2 corresponding to a digital value of a reset signal. Thereafter, an image signal processor ISP may generate an image using the first image data and the second image data.

Figure 17:
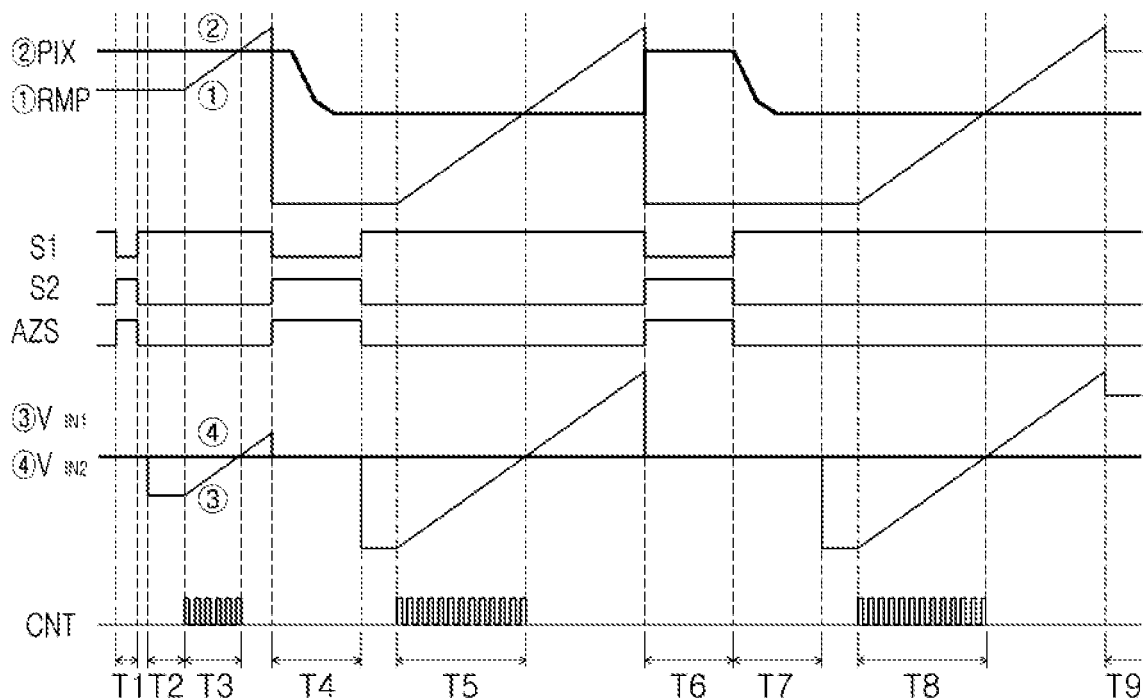
FIG. 17 is a timing diagram illustrating an example in which a sampling circuit operates in a second mode according to an example embodiment of the present disclosure.

FIG. 17 is a timing diagram illustrating an example in which a sampling circuit operates in a second mode according to an example embodiment.

Referring to FIG. 17 with reference to FIG. 6, as an auto-zero control signal AZS is activated (e.g., to be a high logic value) in a first period T1, a sampling circuit 500 may perform a first auto-zero operation. The sampling circuit 500 may be initialized through the first auto-zero operation.

Also, as a first control signal S1 is inactivated (e.g., to be a low logic value) and a second control signal S2 is activated (e.g., to be a high logic value), first and third switches SW1 and SW3 may be turned off and second and fourth switches SW2 and SW4 may be turned on. As the second and fourth switches SW2 and SW4 are turned on, a pixel signal PIX may be input to first and second input nodes IN1 and IN2 of a comparator 510 through first and second capacitors C1 and C2. Accordingly, a voltage VIN1 of the first input node IN1 of the comparator 510 and a voltage VIN2 of a second input node IN2 may be the same as a voltage of the pixel signal PIX. The pixel signal PIX input to the comparator 510 in the first period T1 may be a reset signal, and may have a voltage level higher than that of the ramp signal RMP. A voltage difference between the pixel signal PIX and the ramp signal RMP may be considered as an offset of the ramp signal RMP.

As the first control signal S1 is activated and the second control signal S2 is inactivated in a second period T2, the first and third switches SW1 and SW3 may be turned on and the second and fourth switches SW2 and SW4 may be turned off. As the first and third switches SW1 and SW3 are turned on, a ramp signal RMP may be input to the first input node IN1 of the comparator 510 through a first capacitor C1, and a pixel signal PIX may be input to the second input node IN2 through a second capacitor C2. Accordingly, a voltage VIN1 of the first input node IN1 of the comparator 510 may become the same as a voltage of the ramp signal RMP, and a voltage VIN2 of the second input node IN2 may become the same as a voltage of the pixel signal PIX.

Thereafter, the ramp signal RMP may increase to have a certain slope. By counting a third period T3 from a time point at which the ramp signal RMP increases to a time point at which the ramp signal RMP is greater than the pixel signal PIX using a certain clock signal, analog-digital conversion for a reset signal may be performed.

As the auto-zero control signal AZS is activated again in the fourth period T4, a sampling circuit 500 may perform a second auto-zero operation. The sampling circuit 500 may be reinitialized through the second auto-zero operation. Also, as the first control signal S1 is inactivated and the second control signal S2 is activated, the first and third switches SW1 and SW3 may be turned off and the second and fourth switches SW2 and SW4 may be turned on. As the second and fourth switches SW2 and SW4 are turned on, a pixel signal PIX may be input to the first and second input nodes IN1 and IN2 of the comparator 510 through the first and second capacitors C1 and C2. Accordingly, a voltage VIN1 of the first input node IN1 of the comparator 510 and a voltage VIN2 of the second input node IN2 may be the same as a voltage of the pixel signal PIX.

In a fourth period T4, a ramp signal RMP may have a voltage level lower than an initial voltage thereof. A first image signal may be input to the comparator 510 as a pixel signal PIX, and a decrease of a voltage of the pixel signal PIX caused by the input of the first image signal may be considered as an offset of the ramp signal RMP.

Thereafter, the ramp signal RMP may increase again to have a certain slope. By counting a fifth period T5 from a time point at which the ramp signal RMP increases to a time point at which the ramp signal RMP is greater than the pixel signal PIX using a certain clock signal, analog-digital conversion for the image signal may be performed.

As an auto-zero control signal AZS is activated in a sixth period T6, the sampling circuit 500 may perform a third auto-zero operation. The sampling circuit 500 may be reinitialized through the third auto-zero operation. Also, as the first control signal S1 is inactivated and the second control signal S2 is activated, the first and third switches SW1 and SW3 may be turned off and the second and fourth switches SW2 and SW4 may be turned on. As the second and fourth switches SW2 and SW4 are turned on, a pixel signal PIX may be input to the first and second input nodes IN1 and IN2 of the comparator 510 through the first and second capacitors C1 and C2. Accordingly, a voltage VIN1 of the first input node IN1 of the comparator 510 and a voltage VIN2 of a second input node IN2 may be the same as a voltage of the pixel signal PIX.

The pixel signal PIX input to the comparator 510 in a seventh period T7 may be a second image signal, and may have a voltage level higher than that of the ramp signal RMP. A difference in voltages between the pixel signal PIX and the ramp signal RMP may be considered as an offset of the ramp signal RMP.

Thereafter, the ramp signal RMP may increase again to have a certain slope. By counting an eighth period T8 from a time point at which the ramp signal RMP increases to a time point at which the ramp signal RMP is greater than the pixel signal PIX using a certain clock signal, analog-digital conversion for the image signal may be performed. In a ninth period T9, the ramp signal RMP may be initialized for a subsequent sampling operation.

The image sensor in the example embodiment may generate first image data by calculating a difference between a counter value of the fifth period T5 corresponding to a digital value of the first image signal and a counter value of the third period T3 corresponding to a digital value of a reset signal. Also, the image sensor in the example embodiment may generate second image data by calculating a difference between a counter value of the eighth period T8 corresponding to a digital value of the second image signal and a counter value of the third period T3 corresponding to a digital value of a reset signal.

As the sampling circuit 500 performs the sampling operation using an up-ramp signal, the first and second image data may be generated by deducting a difference between a counter value corresponding to the first and second image signals and a counter value corresponding to a reset signal from 2n (n is a resolution of an analog-digital converter).

Thereafter, an image signal processor ISP may generate an image using the first image data and the second image data.

Figure 18:
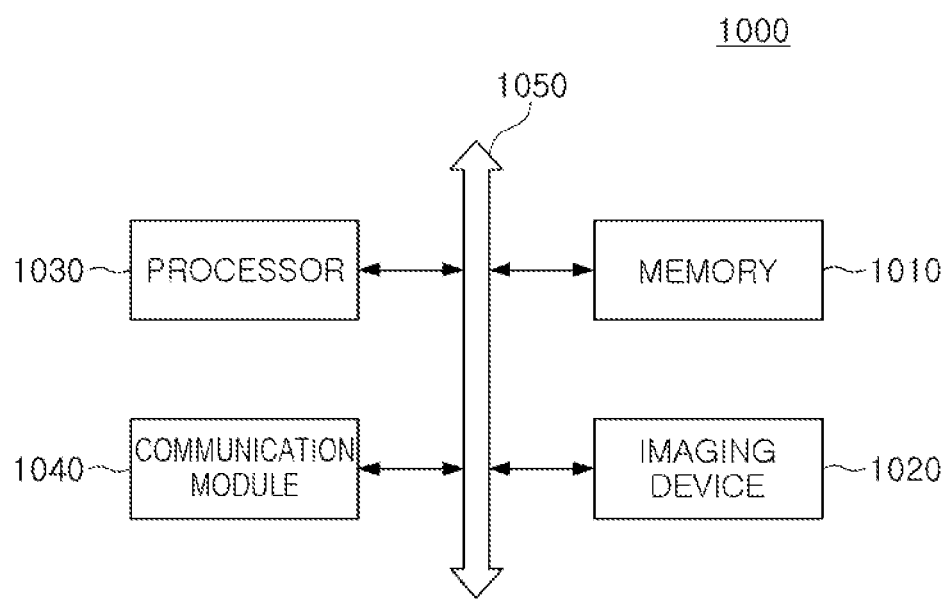
FIG. 18 is a block diagram illustrating an electronic device including an image sensor according to an example embodiment of the present disclosure.

FIG. 18 is a block diagram illustrating an electronic device including an image sensor according to an example embodiment.

Referring to FIG. 18, an electronic device 1000 may include a memory 1010, an imaging device 1020, a processor 1030, a communication module 1040, and others.

Among the elements illustrated in FIG. 18, the communication module 1040 may be provided for the electronic device 1000 to communicate with a video card, a sound card, a memory card, a USB device, or the like. The electronic device 1000 may include a general desktop computer and a laptop computer, and may also include a smartphone, a tablet PC, a smart wearable device, and the like.

The memory 1010 may be implemented by a storage medium for storing data required for an operation of the electronic device 1000, multimedia data, and the like. The memory 1010 may include a storage device configured based on a non-volatile memory device. Also, the memory 1010 may include at least one of a solid state drive (SSD), a hard disk drive (HDD), and an optical disc drive (ODD) as a storage device.

The processor 1030 may perform a certain calculation or may process a command and a task. The processor 1030 may be implemented by a central processing unit (CPU) or a microprocessor unit (MCU), a system-on-chip (SoC), or the like, and may communicate with the memory 1010 and the image sensor 1020 and also with other devices connected to the electronic device 1000 through the communication module 1040, through a bus 1050.

The imaging device 1020 included in the electronic device 1000 illustrated in FIG. 18 may include an image sensor described in the aforementioned example embodiments. As an example, the imaging device 1020 may operate in accordance with the aforementioned example embodiments described with reference to FIGS. 1 to 17.

According to the aforementioned example embodiments, the image sensor may perform a single auto-zero operation in a high gain mode such that reset noise may be removed and image quality may improve.

Also, the image sensor may perform a multi-auto-zero operation in the sampling operation for a high illuminance pixel such that a headroom voltage corresponding to a driving current may be reduced, and power consumption may thus be reduced.

While the example embodiments have been shown and described above, it will be apparent to those skilled in the art that modifications and variations could be made without departing from the scope of the present inventive concept as defined by the appended claims.

What is claimed is:

1. An imaging device, comprising:
a pixel array including a plurality of pixels connected to a plurality of row lines and a plurality of column lines, where each of the plurality of pixels is configured to generate a reset signal and an image signal;
a sampling circuit including a plurality of sampler circuits connected to the plurality of column lines, where each of the plurality of sampler circuits is configured to generate a first comparison signal by comparing the reset signal with a ramp signal and to generate a second comparison signal by comparing the image signal with the ramp signal;
an analog-digital converter configured to convert each of the first comparison signal and the second comparison signal into a respective digital signal; and
a column driver configured to generate image data based on the first comparison signal and the second comparison signal converted into digital signals,
wherein each of the plurality of sampler circuits performs a first auto-zero operation for initializing itself before performing the comparing with respect to the reset signal in a first mode, and in a second mode, performs: (i) a second auto-zero operation before performing the comparing with respect to the reset signal, and (ii) a third auto-zero operation before performing the comparing with respect to the image signal.

2. The imaging device of claim 1, wherein the first mode is a mode for measuring illuminance of a pixel within a first range corresponding to a low illuminance state of the pixel and the second mode is a mode for measuring the illuminance of the pixel within a second range corresponding to a high illuminance state of the pixel.

3. The imaging device of claim 1, wherein an amplification gain of each of the plurality of sampler circuits is higher in the first mode than in the second mode.

4. The imaging device of claim 1, further comprising:
a ramp signal generator configured to generate the ramp signal under control of a timing controller and to output the ramp signal to the sampling circuit,
wherein the ramp signal includes an up-ramp signal and a down-ramp signal.

5. The imaging device of claim 4, wherein each of the plurality of sampler circuits performs the comparison operation using the down-ramp signal in the first mode.

6. The imaging device of claim 4, wherein each of the plurality of sampler circuits performs the comparison operation using the up-ramp signal in the second mode.

7. The imaging device of claim 1, wherein the analog-digital converter generates a first counter value by counting the first comparison signal and generates a second counter value by counting the second comparison signal.

8. The imaging device of claim 7, wherein the column driver generates the image data by differential-calculation of the first counter value and the second counter value.

9. The imaging device of claim 1, wherein each of the plurality of sampler circuits performs the auto-zero operation using the ramp signal and the reset signal in the first mode.

10. The imaging device of claim 1, wherein each of the plurality of sampler circuits performs the auto-zero operation using the reset signal and the image signal in the second mode.

11. An image sensor, comprising:
a pixel array including a plurality of pixels connected to a plurality of row lines and a plurality of column lines, where each of the plurality of pixels is configured to generate a pixel signal;
a plurality of sampler circuits connected to the plurality of column lines, and configured to output a comparison signal by comparing the pixel signal with a ramp signal; and
an analog-digital converter configured to generate image data by converting the comparison signal into a digital signal,
wherein each of the plurality of sampler circuits includes:
a comparator;
a first auto-zero switch connected between a first input node and a first output node of the comparator;

a second auto-zero switch connected between a second input node and a second output node of the comparator;

a first capacitor connected between the first input node and a first node;

a second capacitor connected between the second input node and a second node;

a first switch connected between the first node and an input terminal of the ramp signal;

a second switch connected between the first node and an input terminal of the pixel signal; and third and fourth switches connected in parallel between the second node and the input terminal of the pixel signal.

12. The image sensor of claim 11, wherein the first switch and the third switch operate in response to a first control signal, and the second switch and the fourth switch operate in response to a second control signal.

13. The image sensor of claim 12, wherein the first switch and the third switch alternately operate with the second switch and the fourth switch.

14. The image sensor of claim 11, wherein the first auto-zero switch and the second auto-zero switch operate in response to an auto-zero control signal.

15. The image sensor of claim 11, wherein each of the plurality of sampler circuits outputs the comparison signal through the second output node.

16. An image sensor, comprising:

a plurality of pixels connected to a plurality of row lines and a plurality of column lines and configured to generate a reset signal, a first image signal, and a second image signal;

a plurality of sampler circuits connected to the plurality of column lines and configured to generate a comparison signal by sequentially comparing each of the reset signal, the first image signal, and the second image signal with an up-ramp signal or a down-ramp signal; and an analog-digital converter configured to generate image data by converting the comparison signal into a digital signal, wherein in a first mode, each of the plurality of sampler circuits operates at a first amplification gain and generates the comparison signal using the down-ramp signal, and in a second mode, operates at a second amplification gain smaller than the first amplification gain and generates the comparison signal using the up-ramp signal.

17. The image sensor of claim 16, wherein each of the plurality of sampler circuits performs an auto-zero operation for initializing input and output voltages of each of the plurality of sampler circuits before performing a comparison operation for the reset signal, in the first mode.

18. The image sensor of claim 17, wherein each of the plurality of sampler circuits performs the auto-zero operation using the up-ramp signal or down-ramp signal and the reset signal.

19. The image sensor of claim 16, wherein each of the plurality of sampler circuits performs an auto-zero operation for initializing input and output voltages of each of the plurality of sampler circuits before performing each comparison operation for the reset signal, the first image signal, and the second image signal, in the second mode.

20. The image sensor of claim 19, wherein each of the plurality of sampler circuits performs the auto-zero operation using the reset signal, the first image signal, and the second image signal.

* * * * *